US010468061B1

(12) United States Patent
Farhan et al.

(10) Patent No.: US 10,468,061 B1
(45) Date of Patent: *Nov. 5, 2019

(54) INDEXING ZONES FOR STORAGE DEVICES

(71) Applicant: Amazon Technologies, Inc., Seattle, WA (US)

(72) Inventors: Munif F. Farhan, Clyde Hill, WA (US); Douglas Stewart Laurence, Mercer Island, WA (US); Darin Lee Frink, Lake Tapps, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,792

(22) Filed: Jul. 20, 2018

Related U.S. Application Data

(63) Continuation of application No. 15/444,142, filed on Feb. 27, 2017, now Pat. No. 10,037,778.

(51) Int. Cl.
*G11B 5/09* (2006.01)
*G11B 20/12* (2006.01)

(52) U.S. Cl.
CPC .. *G11B 20/1217* (2013.01); *G11B 2020/1218* (2013.01)

(58) Field of Classification Search
None
See application file for complete search history.

(56) References Cited

U.S. PATENT DOCUMENTS

| 8,555,004 B2* | 10/2013 | Kitagawa | G06F 3/0605 711/114 |
| 10,037,778 B1* | 7/2018 | Farhan | G11B 27/329 |
| 2005/0033720 A1* | 2/2005 | Verma | G06F 9/466 |
| 2007/0101054 A1* | 5/2007 | Sivathanu | G06F 3/0623 711/112 |
| 2010/0205160 A1* | 8/2010 | Kumar | G06F 16/31 707/696 |
| 2011/0282884 A1* | 11/2011 | Ma | G11B 27/309 707/741 |
| 2011/0289052 A1* | 11/2011 | Rambacher | G06F 16/273 707/624 |
| 2013/0073821 A1* | 3/2013 | Flynn | G06F 3/061 711/162 |
| 2013/0166855 A1* | 6/2013 | Batwara | G06F 3/0608 711/154 |
| 2014/0258236 A1* | 9/2014 | Vijayan | G06F 11/1448 707/639 |

* cited by examiner

*Primary Examiner* — Peter Vincent Agustin
(74) *Attorney, Agent, or Firm* — Klarquist Sparkman, LLP

(57) ABSTRACT

Technologies are provided for using an index in one region of a storage device to track modifications to data stored in another region of the storage device. The index can be stored in a first storage region using a first storage format, and data items can be stored in a second storage region using a second storage format. The index can map logical identifiers for data items to locations in the second storage region where the data items are stored. Instead of modifying a data item in the second storage device region, an entry in the index can be updated to mark the data item as deleted. Requests for data items can be reconciled using the index before returning the requested data items. Storage locations in the second region that are associated with index entries that are marked as deleted can be reclaimed and used to store additional data items.

20 Claims, 17 Drawing Sheets

INDEXING ZONES FOR STORAGE DEVICES

BACKGROUND

Storage device manufacturers continue to develop new ways to increase the capacity of storage devices. However, many recently-developed techniques for increasing storage capacity, such as shingled magnetic recording (SMR) also decrease data read and/or write access performance. In an attempt to mitigate this lower data access performance, some storage devices include internal buffers, such as on-device caches, where data can be stored temporarily for faster read/write operations. In an attempt to mitigate the lower write performance of SMR, some SMR hard drives use regions where some data can be written using a non-SMR storage format (such as perpendicular magnetic recording (PMR)) and then moved to a permanent storage of the storage device at a later point in time. However, once the data is written to an SMR region of the storage device, it can be expensive to modify the data using random-access write requests, due to the overlapping nature of the SMR storage format.

DETAILED DESCRIPTION

Some storage devices support storage formats that increase storage capacity at the expense of data write performance and/or data durability. For example, the SMR storage format can store more data than some previous storage formats, such as PMR, but random-access write operations can be more expensive. Due to the overlapping nature of SMR, data cannot be modified in-place. Instead, the data to be modified, and additional surrounding data, must be read, modified, and rewritten. As another example, the multi-level cell (MLC) storage format has a relatively larger capacity than some other storage formats, such as single-level cell (SLC), but has lower relative write endurance. For some storage devices that support higher-capacity storage formats, such as MLC, frequent random-access write operations can result in increased write amplification, which can reduce write endurance.

At least some of the embodiments of the technologies described herein solve these problems by using a storage index in a storage region with one storage format to defer and/or reduce write operations performed in a separate storage region with a different storage format.

For example, a storage device can be configured to store data in two separate storage regions using different storage formats. A storage index can be created and maintained in a first storage region using a first storage format that associates logical identifiers for records with storage locations in a second storage region where the records are stored using a second storage format. When a request is received to modify a record in the second storage region, instead of performing a random-access write operation to modify the record in the second storage region, a random-access write operation can be used to update an entry in the storage index that is associated with the record. For example, a request to delete a record stored in the second storage location can be processed by updating an index entry associated with the record to indicate that the record is deleted. Additionally or alternatively, a request to store a new version of a record can be processed by using a sequential write operation to append the new version of the record to the second storage region and updating an entry in the storage index associated with the previous version of the record to mark it as deleted.

Requests for records stored in the second storage region can be reconciled using the storage index to determine whether the requested records are marked as deleted before returning the records. Additionally or alternatively, storage locations in the second storage region that are associated with records that are marked as deleted can be reclaimed and used to store additional record data.

Figure 1:
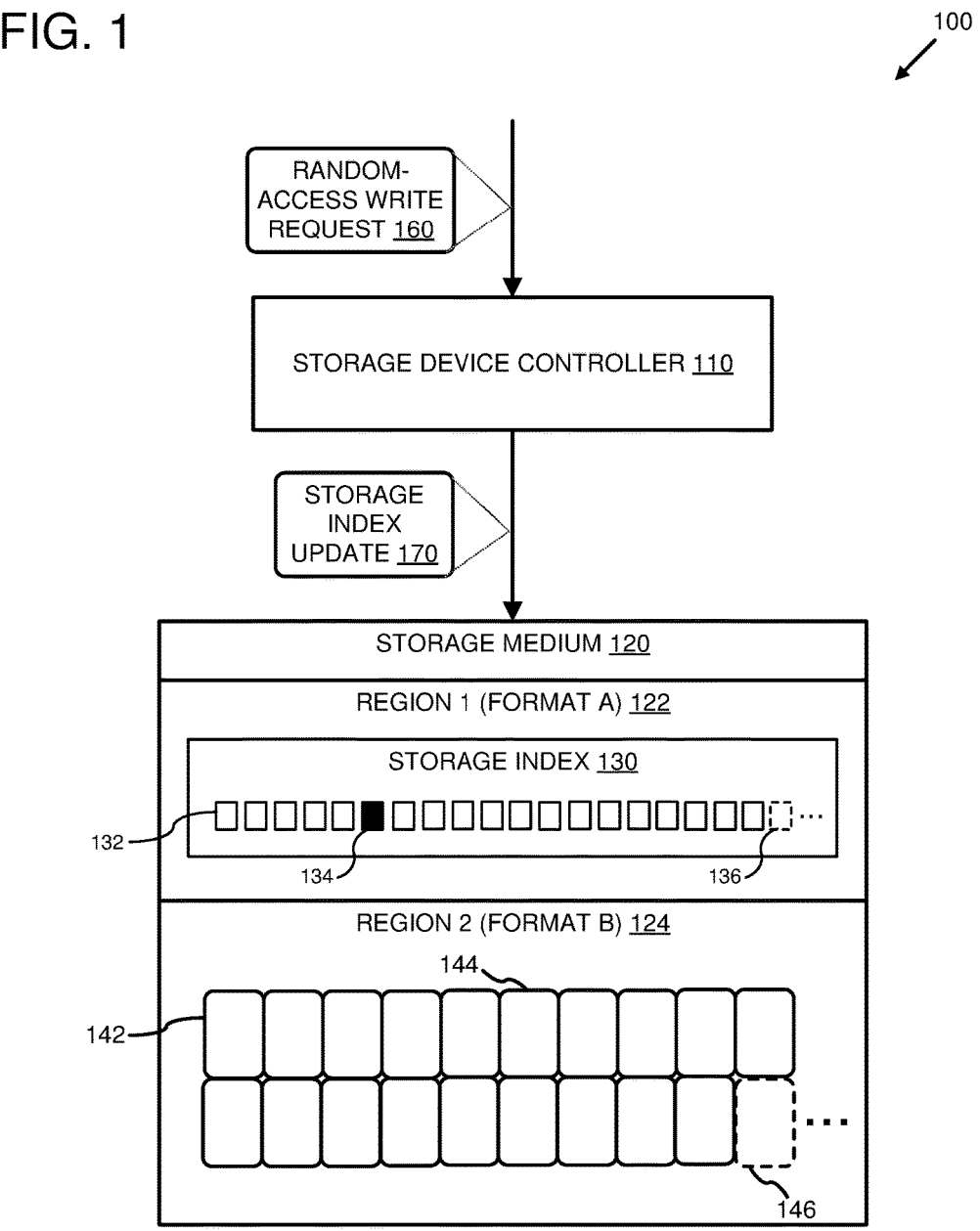
FIG. 1 is a system diagram depicting an example system configured to process a random-access write request using a storage index.

FIG. 1 as a system diagram depicting an example system 100 configured to process a random-access write request 160 using a storage index 130. The example system 100 comprises a storage device controller 110 connected to a storage medium 120 comprising two storage regions 122 and 124. The two storage regions 122 and 124 configured to store data using two different storage formats. The storage region 122 is configured to store storage index 130 using a first storage format (format A). The storage region 124 is configured to store data items in physical storage locations (e.g., 142) using a second storage format (format B).

The storage index 130 comprises multiple entries (e.g., 132) that map logical identifiers for data items to physical storage locations in the storage region 124 where the data items are stored. For example, the entry 132 can associate a logical identifier for a given data item with the physical storage location 142 where the data item is stored in the storage region 124.

Storage device controller 110 can be configured to receive the random-access write request 160 and to process the random-access write request 160 using the storage index 130 in the storage region 122. In at least one embodiment, the storage device controller 110 can detect that the write request 160 is a random-access write request and can process the request 160 by performing a storage index update operation 170 to update the storage index 130. For example, the random-access write request 160 can comprise a request to delete a data item stored in the storage region 124, such as the data item stored in a physical storage location 144. The storage device controller 110 can be configured to identify an entry 134 in the storage index 130 associated with the data item to be deleted. Instead of performing a random-access write operation to delete the data item in the physical storage location 144 in the storage region 124, the storage device controller 110 can use the storage index update operation 170 to mark the entry 134 as deleted. (In FIG. 1, the storage index entry 134 is depicted as black to indicate that the entry 134 has been marked as deleted.) Marking the entry 134 as deleted instead of performing a random-access write operation on the storage location 144 can be advantageous in scenarios where the storage format of the storage region 122 exhibits better random-access write performance characteristics than the storage format of the storage region 124. Additionally or alternatively, the storage format of the storage region 122 can exhibit better write endurance characteristics than the storage format of the storage region 124. In at least some cases, updating the storage index 130 instead of performing a random-access write operation on the storage region 124 can result in improved overall write performance and/or endurance for the storage medium 120.

Optionally, the random write request 160 can comprise a request to store a data item in the storage region 124. The storage device controller 110 can write the data item to a storage location 146 at an end of the storage region 124 using one or more sequential write operations. The storage device controller 110 can update the storage index 130 to add a new entry 136 that associates the storage location 146 with a logical identifier for the data item. In at least some embodiments, the data item can be a new version of an existing data item. In such an embodiment, an entry in the storage index 130 that is associated with the existing data item can be marked as deleted.

In any of the examples described herein, a storage device can be any device capable of storing data in at least two separate regions using at least two different storage formats, including a device capable of storing data in separate regions of one storage medium using different storage formats. For example, the storage device can be a magnetic storage device, such as a hard disk drive, that is capable of storing data in multiple magnetic recording formats. Other examples of storage devices include flash storage devices (such as NAND-type flash devices and NOR-type flash devices), and random-access data storage devices (such as DRAM devices), that are configured to store data using more than one storage format.

In some embodiments, the storage device comprises multiple disparate storage media. For example, the storage device can be a hard disk drive that comprises one or more magnetic disks and an internal memory. In another example, the storage device comprises solid state storage and magnetic storage. Other combinations of disparate storage media are also possible.

The storage device can organize storage locations into multiple storage regions. Different storage regions can be associated with different storage characteristics. For example, zones can store data using different storage formats.

Storage regions of a storage device can also be associated with different levels of storage reliability and/or data access performance. For instance, the storage device can be configured to store data written to one storage region redundantly, such as by writing the data multiple times on separate media. A particular example of this is a storage device that comprises multiple magnetic disk platters and at least one storage region that duplicates data written to the storage region across the multiple magnetic disk platters.

In any of the examples described herein, a storage format is a format for recording data on a physical storage medium. Examples of storage formats include perpendicular magnetic recording (PMR), shingled magnetic recording (SMR), heat-assisted magnetic recording (HAMR), microwave assisted magnetic recording (MAMR), bit patterned magnetic recording (BPMR), single-level cell (SLC) storage, multi-level cell (MLC) storage, and triple-level cell (TLC) storage.

Different storage formats can have different data capacities when storing data on the same storage medium. For example, data can be stored more compactly by using an SMR format than by using a PMR format. However, the different storage formats can also have different performance and/or durability characteristics. For example, in some cases random-access write operations can be performed faster when data is stored using a PMR format than if the same data were stored using an SMR format.

In any of the examples described herein, a storage device controller can comprise one or more hardware components, such as a firmware, of a storage device. Alternatively, the storage device controller can be implemented at an intermediate layer between an application and the storage device. Such an intermediate layer controller can comprise software (such as a driver) and one or more processors, and/or an application-specific integrated circuit (ASIC).

In some embodiments, the storage device controller can be part of an application. In such an embodiment, the application may use the storage device controller to access a storage device directly, without using an intermediate layer, such as a driver.

The storage device controller can be located on a computer containing the storage device, or on a separate computer that is connected to the storage device via a communications channel, such as a computer network.

In any of the examples described herein, a data block (or block of data) can be a sequence of data units, such as bytes, bits, etc., that has a fixed size (sometimes referred to as a "block size"). In a storage device that supports data blocks, data is read from and/or written to the storage device one block at a time. A data block can have a physical address that identifies a position where it is stored in the storage device. Data stored in a data block can be identified using a storage location identifier, such as a block address and or an extent or offset in a data block.

Figure 2:
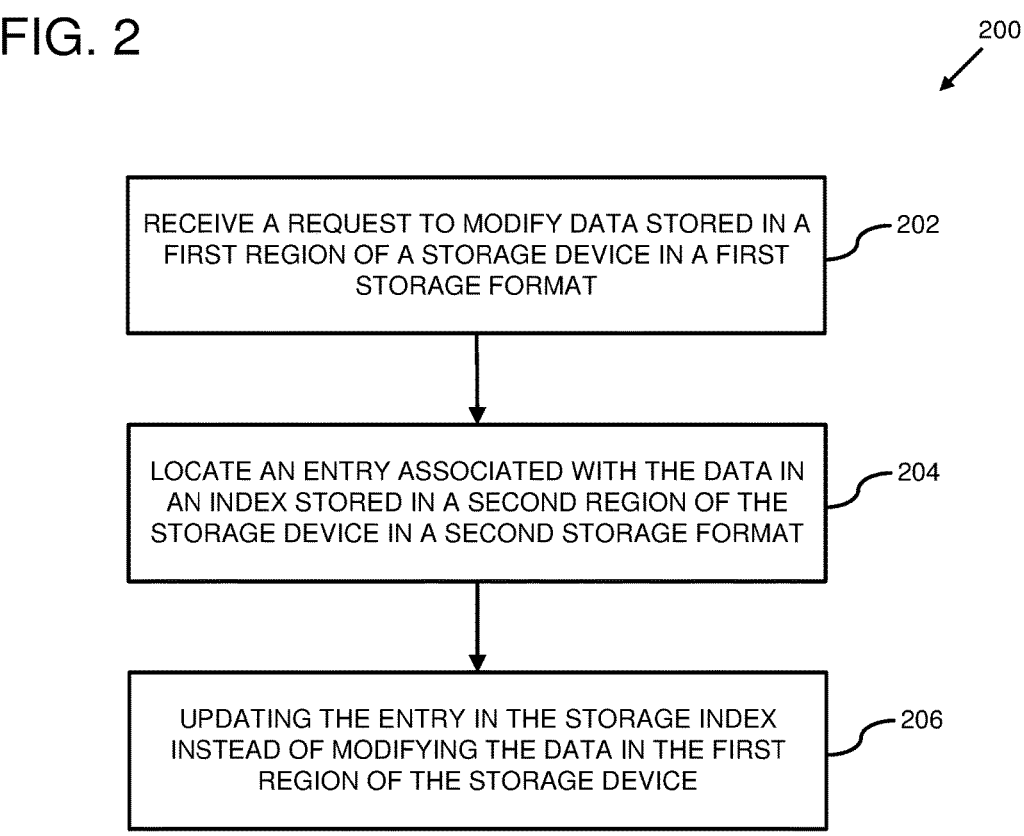
FIG. 2 is a flowchart of an example method for processing a request to modify data in one storage device region by updating an index in a different storage device region.

FIG. 2 as a flowchart of an example method 200 for processing a request to modify data in one storage device region by updating an index in a different storage device region, wherein the storage device regions store data using different storage formats. Any of the example systems described herein can be used to perform the example method 200.

At 202, a request is received to modify data stored in a first region of the storage device using a first storage format. In at least one embodiment, the request to modify the data comprises a request to delete a record stored in the first region of the storage device using the first storage format. In a different or further embodiment, the request comprises a request to store a new version of a record that is stored in the first region of the storage device.

At 204, an entry associated with the data is located in a storage index stored in a second region of the storage device using a second storage format. Locating the entry in the storage index can comprise searching for an entry that contains a logical identifier that is associated with the data. For example a logical identifier for the data can be provided as part of the request to modify the data. In such an embodiment, the storage index can organize entries according to logical identifiers for stored data items.

Alternatively or additionally, the request to modify the data can identify one or more storage locations in the first region of the storage device, where the data that is to be modified is stored. For example, one or more storage location identifiers, such as block addresses and/or extents or offsets within data blocks, can be provided as part of the request. In such an embodiment, one or more of the storage location identifiers can be used to locate the entry in the storage index. In a particular example, the storage index organizes entries using storage location identifiers for first and/or last storage locations where associated data are stored in the first storage region.

In at least one embodiment, the storage index comprises a tree data structure (such as a b-tree), and locating the entry in the storage index associated with the data to be modified comprises using an identifier associated with the data (such as a logical identifier and/or storage location identifier) to locate a leaf node in the tree data structure that is associated with the data. Such a leaf node in the tree data structure can contain a logical identifier associated with the data and can identify one or more storage locations in the first region of the storage device where the data are stored.

At 206, the entry in the storage index is updated instead of modifying the data in the first region of the storage device 206. In an embodiment where the request to modify the data comprises a request to delete the data, updating the entry in the storage index can comprise marking the entry as deleted. For example, the entry can include a value (such as a Boolean value) that indicates whether the data is marked is deleted. One or more random-access write operations can be used to update such a value in the storage index entry.

In an embodiment where the request to modify the data comprises a request to store a new version of a record that is stored in the first region, the example method 200 can further comprise writing the new version of the record to one or more sequential storage locations in the first region and adding a new entry to the storage index in the second region. The new entry can associate the one or more sequential storage locations in the first region with a logical identifier for the new version of the record. The logical identifier may be provided as part of the request to modify the data. Alternatively, the logical identifier may be generated and provided in response to the request. In at least one embodiment, the storage index in the second region can indicate that the one or more sequential storage locations in the first region are available for storing data.

Figure 3:
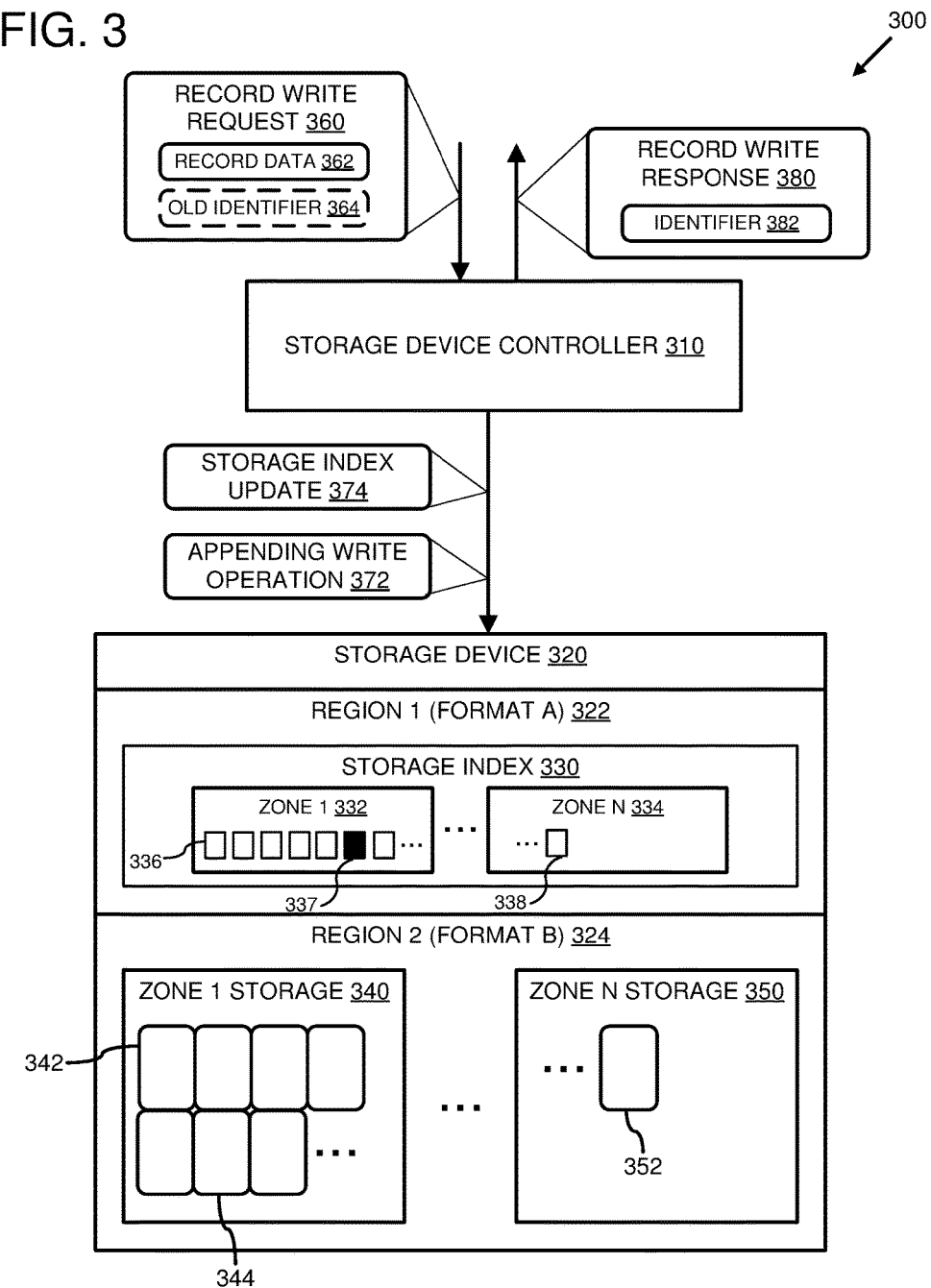
FIG. 3 is a system diagram depicting an example system configured to maintain a storage index comprising multiple zones in one storage device region for tracking modifications to storage locations associated with the multiple storage zones in a separate storage device region.

FIG. 3 is a system diagram depicting an example system 300 configured to maintain a storage index 330 with multiple index zones 332-334 in a storage device region 322. The storage index 330 can be used to track modifications of records stored in storage locations (e.g., 342) in a different storage device region 324.

A storage device 320 is configured to store data in the two different storage device regions 322 and 324 using two different storage formats. The storage device region 322 comprises the storage index 330, which comprises multiple storage index entries (e.g., 336). The storage index entries (e.g., 336) associate logical identifiers for records with storage locations (e.g., 342) in the storage device region 324 where the records are stored. The storage index 330 organizes the record entries (e.g., 336) into multiple storage index zones 332-334. The index zones 332-334 can be associated with contiguous ranges of storage locations in the storage device region 324. For example, the storage index zone 332 is associated with the range of storage locations 340 in the storage device region 324, and the storage index zone 334 is associated with the range of storage locations 350. A storage index zone can be associated with one or more storage locations in the storage device 324, and the number of storage locations that a storage index zone is associated with can vary from zone to zone.

The storage locations (e.g., 342) are depicted as rectangles for illustration purposes. This depiction is not intended to represent an actual physical structure or arrangement of the storage locations in the storage device 320.

In a particular embodiment, a storage index zone can be created when one or more records are written to the storage device region 324, for example as part of a sequential write operation. In such an embodiment, the storage locations in the region 324 to which the records are sequentially written can be identified and associated with a new zone that is created in the storage index 330. Storage index entries for the newly created records and can be added to the storage index 330 and associated with the newly created zone. The created storage index entries can associate logical identifiers for the newly created records with the storage locations in the storage region 324 in which the records are written.

The example system 300 comprises a storage device controller 310 configured to receive record write requests (e.g., 360) and to process the record write requests by performing appending write operations (e.g., 372) and storage index update operations (e.g., 374). The appending write operations (e.g., 372) can comprise one or more sequential write operations to store record data in one or more storage locations in the storage device region 324. The storage index update operations (e.g., 374) can comprise one or more random-access write operations to modify the storage index 330 in the storage device region 322.

In FIG. 3, the storage device controller 310 is depicted as receiving a record write request 360 comprising record data 362 for one or more records to be written to one or more storage locations in the storage device region 324. The storage device controller 310 can transmit an appending write operation 372 to the storage device 320 to store the record data 362 in the storage location 352 in the storage device region 324 using the storage format B. The storage device controller 310 can transmit the storage index update 374 to the storage device 322 update the storage index 330 using the storage format A to create a new storage index entry 338 to associate a logical identifier for the created record with the storage location 352. In at least one embodiment, the storage device controller 310 determines that the storage location 352 lies within a range of storage locations 350 that are associated with the storage zone 334. In such an embodiment, the storage index update 374 can associate the index entry 338 with the storage zone 334. In a different or further embodiment, the storage zone 334 is created and associated with the range of storage locations 350 as part of the write operation.

The storage device controller 310 can transmit a record write response 380 after the appending write operation 372 and the storage index update operation 374 have been performed. The record write response 380 comprises a logical record identifier 382 for the newly created record. The logical record identifier 382 can be provided as part of a subsequent record read request (not shown), and can be used by the storage device controller 310 to locate the entry 338 in the storage index 330 associated with the created record.

Optionally, the record write request 360 comprises an old logical record identifier 364. For example, the record data 362 can represent an updated version of a record that was previously stored in the storage device region 324. The previously stored record can be associated with the old logical record identifier 364. In such an embodiment, the storage device controller 310 can use the old logical record identifier 364 to locate an entry 337 in the storage index 330 associated with the previously stored record. The storage device controller 310 can examine the entry 337 to determine that the previously stored version of the record is stored in the storage location 344. Instead of updating the record data stored in the storage location 344, a storage device controller 310 can mark the index entry 337 as deleted and can write the record data 362 for the new version of the record to the storage location 352 as a sequential write operation.

Figure 4:
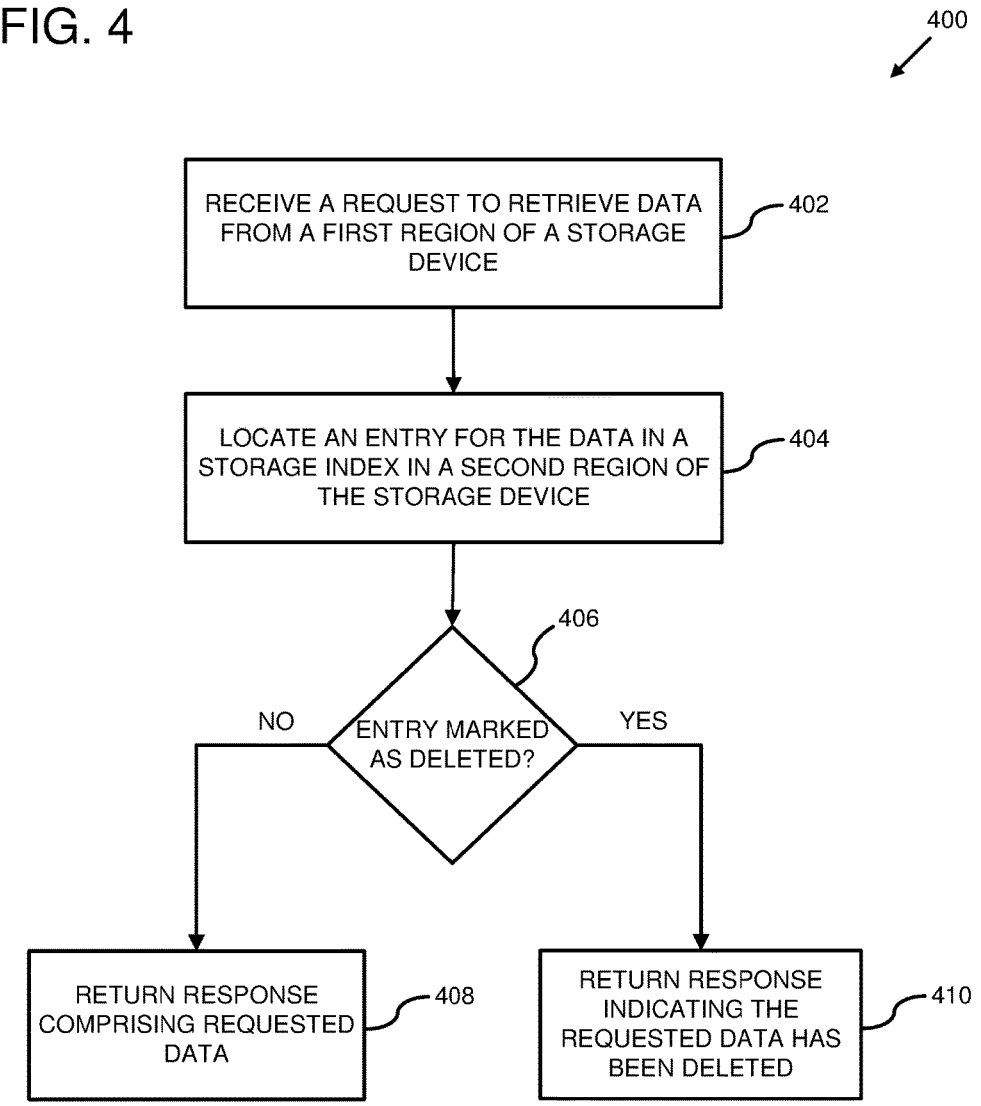
FIG. 4 is a flowchart of an example method for retrieving requested data using a storage index.

FIG. 4 is a flowchart of an example method 400 for retrieving requested data from a region of the storage device using a storage index stored in a different region of the storage device. Any of the example systems described herein can be used to perform the example method 400.

At 402, a request is received to retrieve data that is stored in a first region of the storage device using a first storage format. The request can comprise one or more identifiers (such as logical identifiers and/or storage location identifiers) associated with the data to be retrieved. In at least one embodiment, the request comprises identifiers associated with multiple data items to be retrieved from the first region of the storage device.

At 404, an entry for the data is located in a storage index that is stored in a second region of the storage device using a second storage format. Locating the entry in the storage index can comprise searching entries in the storage index and identifying one of the entries that is associated with an identifier provided in the request to retrieve the data. In an embodiment where the request comprises identifiers associated with multiple data items, multiple entries in the storage index associated with the different identifiers can be located.

In at least one embodiment, the second region of the storage device can contain multiple storage indexes that organize entries for data items based on different types of identifiers. For example, a second region of the storage device can contain a first index which organizes entries for data items based on logical identifiers for the data items. The second region of the storage device can further contain a second index which organizes entries for data items based on storage location identifiers associated with storage locations in the first region of the storage device where the data items are stored. In such an embodiment, the index that is used to locate an entry can be chosen based on a type of data item identifier that is provided in the request to retrieve the data.

In some embodiments, the storage index can organize entries into storage zones. In such embodiments, locating the entry in the storage index can comprise locating a storage zone page in the storage index using at least part of an identifier associated with the data, wherein the storage zone page identifies a range of storage locations in the first region of the storage device and comprises entries associating data identifiers with storage locations within the range of storage locations. Locating the entry in the storage index can further comprise locating an entry in the storage zone page entries using the identifier associated with the data, after a storage zone page has been retrieved. In at least one embodiment, the storage index organizes index records for data items into multiple storage zones, wherein a storage zone is associated with a contiguous set of physical storage locations in the first region of the storage device where data items in the storage zone are stored.

In a different or further embodiment, the storage index comprises a tree data structure with leaf nodes associated with storage zones, wherein a leaf node for a storage zone comprises a range of storage addresses associated with a set of contiguous physical storage locations in the first region of the storage device and one or more index records for data items in the storage zone. In such an embodiment, an identifier for a data item can be used to locate a leaf node associated with a storage zone containing an index record for the data item, and to locate the index record for the data item in the leaf node's index records.

At 406, the entry for the data is analyzed to determine whether the entry is marked as deleted. The entry can comprise a value (such as a Boolean value) that indicates whether the entry is marked as deleted. In an embodiment where identifiers for multiple data items are provided in the request to retrieve the data, retrieved entries for each of the data items can be analyzed to determine whether each data item is marked as deleted.

If the entry is marked as deleted, then at 410 a response is returned that indicates that the requested data has been deleted. In at least one embodiment, the response can indicate that the data was found but was marked as deleted. In an alternative embodiment, the response can indicate that the requested data was not found. In at least some embodiments where identifiers for multiple data items are provided in the request to retrieve the data, the response can be returned at 410 if all of the retrieved entries for the data items are marked as deleted. Alternatively, if at least one of the retrieved entries is marked as deleted, the response returned at 410 can indicate that none of the requested data items were found.

If the entry is not marked as deleted, then at 408 a response is returned comprising the requested data. In at least some embodiments where identifiers for multiple data items are provided in the request to retrieve the data, data can be returned that is associated with the retrieved entries that are not marked as deleted. Data that is associated with retrieved entries that are marked as deleted can be omitted or filtered out.

Figure 5:
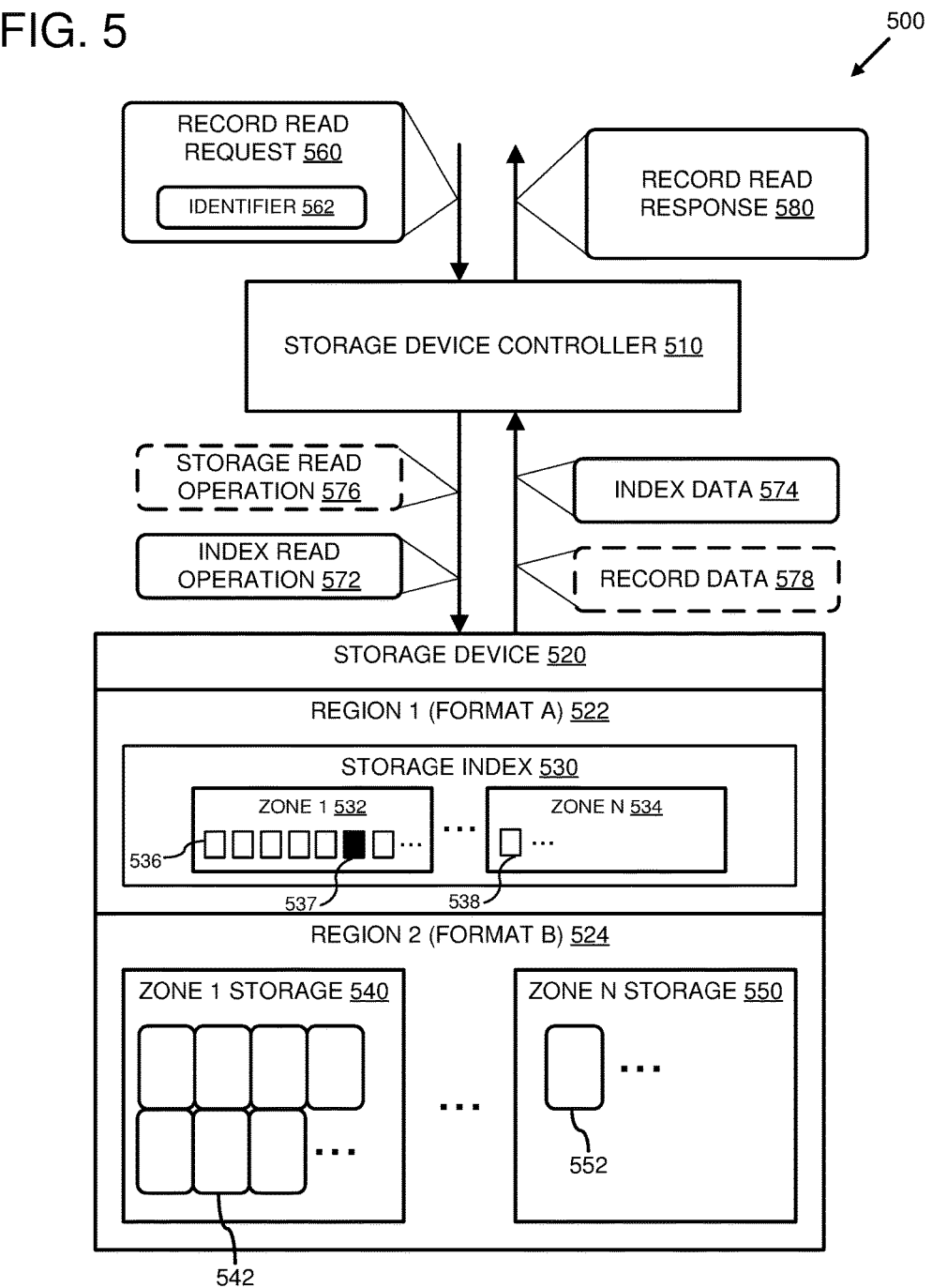
FIG. 5 is a system diagram depicting an example system configured to retrieve a record using a storage index and a provided record identifier.

FIG. 5 is a system diagram depicting an example system 500 configured to retrieve a record using a storage index 530 and a provided record identifier 562. The example system 500 comprises a storage device controller 510 configured to receive a record read request 560. The record read request 560 comprises the record identifier 562 associated with the record to be read. The storage device controller 510 is configured to transmit an index read operation 572 to a storage device 520.

Storage device 520 comprises a first storage region 522 comprising the storage index 530 that is stored using a first storage format (format A), and a second storage region 524 comprising multiple storage locations (e.g., 542 and 552) where multiple records are stored using a second storage format (format B). The storage index 530 comprises multiple index entries (e.g., 536-538) that map record identifiers to storage locations in the region 524 where the records are stored. The storage index 530 is configured to organize the entries 536-538 into multiple storage zones 532-534. The storage zones are associated with ranges of storage locations in the region 524. For example, the storage zone 532 is associated with the range of storage locations 540, the storage zone 534 is associated with the range of storage locations 550, etc.

The storage device controller 510 is configured to transmit the index read operation 572 to the storage device 520 to retrieve an index entry from the storage index 530 that is associated with the provided record identifier 562. The storage device 520 is configured to retrieve and transmit the requested index data 574 to the storage device controller 510. In at least one embodiment, the identifier 562 is used to locate a particular index entry (e.g., 537) and the index data 574 comprises the particular entry. In a different or further embodiment, the identifier 562 is used to retrieve index data for a storage zone containing the requested record. In such an embodiment, the index data for the entire zone is returned in the index data 574. For example, the storage device controller 510 can use the identifier 562 to locate the index data for the zone 532 containing the entry 537 that is associated with the record identifier. The index data 574 can then include index data for the zone 532 comprising all of the index entries associated with the zone 532. The storage device controller 510 can then retrieve the particular entry 537 that is associated with the requested record from the index data 574. In a particular embodiment, the record identifier 562 is a logical identifier that comprises an identifier for the zone associated with the requested record and an identifier for the requested record within the zone.

Using the retrieved index data 574, the storage device controller 510 can determine whether the requested record is marked as deleted. For example, the index entry 537 can indicate that the data for the requested record stored in the storage location 542, but that the record has been marked as deleted. In such a scenario, storage device controller 510 can return a record read response 580 comprising an indicator that the requested record associated with the identifier 562 does not exist in the storage device 520.

In another example, the identifier 562 can be associated with an entry in the storage index 530 that is not marked as deleted (such as the index entry 538). In such a scenario, the storage device controller 510 can transmit a subsequent storage read operation 578 to retrieve data for the requested record from the storage location (e.g., 552) in the region 524. Responsive to such a storage read operation, the storage device 520 can retrieve the requested record data 578 from the region 524 using a random-access read operation, and can transmit the requested record data 578 to the storage device controller 510. In such cases, the record read response 580 can include all or part of the record data 578.

Figure 6:
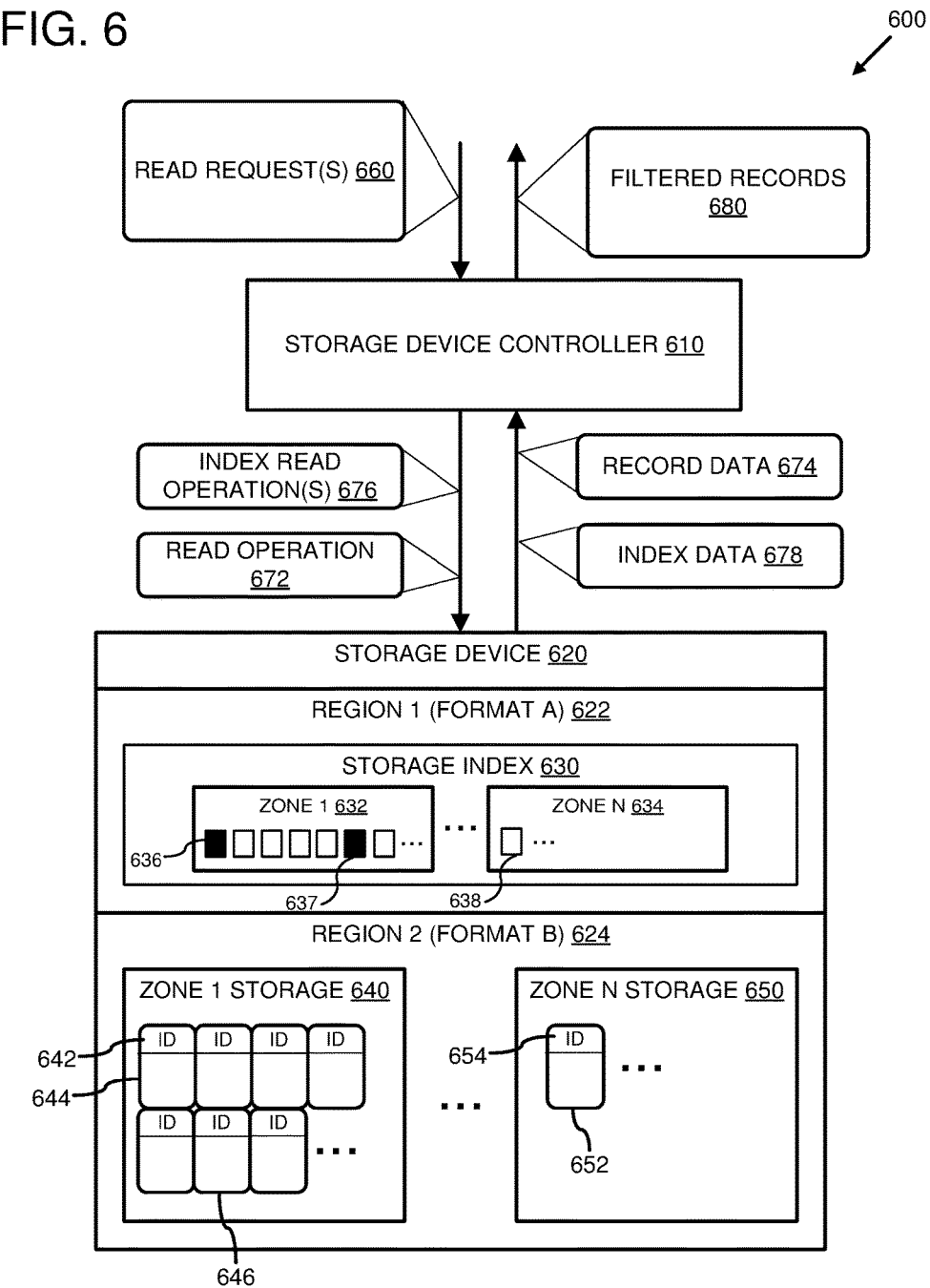
FIG. 6 is a system diagram depicting an example system configured to retrieve records using a storage index and record identifier headers.

FIG. 6 is a system diagram depicting an example system 600 configured to retrieve records from a storage device 620 using a storage index 630 and record identifier headers (e.g., 642 and 654). The example system 600 comprises a storage device controller 610 connected to a storage device 620. The storage device 620 comprises a first storage region 622 and a second storage region 624. The storage device 620 is configured to store data in the first region 622 using a first storage format (format A) and to store data in the second region 624 using a second storage format (format B).

The storage device controller 610 is configured to create and maintain a storage index 630 in the first storage region 622 of the storage device 620. The storage index 630 comprises multiple index record entries (e.g., 636-638) organized into multiple storage zones 632-634. The storage zones 632-634 are associated with ranges of storage locations 640-650 in the second region 624 of the storage device 620. The index record entries (e.g., 636-638) associate logical record identifiers with storage locations (e.g., 644, 646, and 652) where records associated with the logical record identifiers are stored in the second region 624 of the storage device 620. For example, the index record entry 636 can associate a logical identifier for a record with the storage location 644 where the record is stored in the second region 624.

The records stored in the second region 624 (e.g., 644, 646, 652) comprise record headers that include the logical record identifiers for the respective records. For example, the record stored in the storage location 644 comprises a record header 642 that includes the logical record identifier for the record. Similarly, the record stored in the storage location 652 comprises a record header 654 that includes a different logical record identifier associated with a different record.

The storage device controller 610 is configured to process record read requests by retrieving record data from the storage region 624 and reconciling the retrieved records using the storage index 630 to determine whether one or more requested records are marked as deleted in the storage index 630. The storage device controller 610 is configured to receive one or more read requests 660 to retrieve record data from the storage device 620. A read request can comprise one or more storage location identifiers (such as block addresses and/or extents or offsets within one or more data blocks) for storage locations in the second region 624. In a particular embodiment, a read request can comprise a request to retrieve data stored in a range of storage locations in the second region 624 associated with a particular storage zone (e.g., 640-650). In a different or further embodiment, the one or more read requests 660 comprises multiple requests to retrieve data from a sequence of storage locations, wherein each request comprises a storage location identifier for one storage location in the sequence.

The storage device controller 610 is configured to transmit a read operation 672 to the storage device 622 retrieve requested record data from the one or more identified storage locations in the second region 624. The storage device 620 is configured to retrieve the requested record data from the second storage region 624 and to transmit the retrieved record data 674 to the storage device controller 610. The storage device controller 610 is configured to analyze the retrieved record data 674 to locate record headers for one or more records contained in the record data 674. As discussed above, the record headers can contain logical record identifiers for the respective associated records. The storage device controller 610 can transmit one or more index read operations 676 to the storage device 620 to retrieve index entries in the storage index 630 using the logical record identifiers extracted from the record data 674. The storage device 620 is configured to retrieve the requested index data 678 from the storage index 630 and to transmit it to the storage device controller 610. In at least one embodiment, the one or more extracted record identifiers are provided as part of the index read operation 676 and the index data 678 comprises one or more index record entries (e.g., 636-638) associated with the provided logical record identifiers. In a different or further embodiment, the logical record identifier can be used to retrieve an entry in the storage index 630 for a storage zone (e.g., 632-634) that contains an index record entry associated with the logical record identifier. In such an embodiment, the index data 678 can comprise the retrieved entry for the storage zone and the storage device controller 610 can subsequently extract the index record entry associated with the logical record identifier from the index entry for the storage zone.

The storage device controller 610 can use the index data 678 to filter all or part of the record data 674. The storage device controller 610 can analyze an index record entry for a given logical record identifier to determine whether the record data associated with the logical record identifier is marked as deleted. If the record data is marked as deleted in the index record entry, the storage device controller can filter out the associated record data. The storage device controller 610 can transmit record data for records that are not marked as deleted in a filtered records response 680. In a scenario were all requested record data is marked as deleted, the filtered records response 680 can indicate that the requested data does not exist.

In a particular example, the one or more read requests 660 comprises a request to retrieve the record data stored in the range of storage locations associated with the storage zone 632. The read operation 672 can comprise one or more instructions to retrieve the data in the range of storage locations 640 from the second storage region 624. The storage device controller 610 can analyze the retrieved record data 674 to locate the record headers (e.g., 642), and to extract the logical record identifiers contained within the record headers. The one or more index read operations 676 can comprise one or more instructions to retrieve the index record entries for the storage zone 632 (e.g., 636 and 637). The storage device controller 610 can analyze the retrieved index data 678 to determine that the index record entries 636 and 637 are marked as deleted. The storage device controller 610 can filter out the record data retrieved from the storage locations 644 and 646 associated with the index record entries 636 and 637, respectively. The storage device controller 610 can transmit the remaining retrieved record data in the filtered records response 680.

The example system 600 can be advantageous in some scenarios where record data is retrieved using storage location identifiers instead of logical record identifiers. However, the record data stored in the storage locations of the second region 624 must contain record headers comprising the logical record identifiers. The logical record identifiers must be retrieved from the record headers and used to reconcile the retrieved record data 674 with the storage index 630. Additionally, in at least some cases, record data is retrieved from the storage device 624 records that have been marked as deleted and thus will not be transmitted as part of the filtered records response 680.

Figure 7:
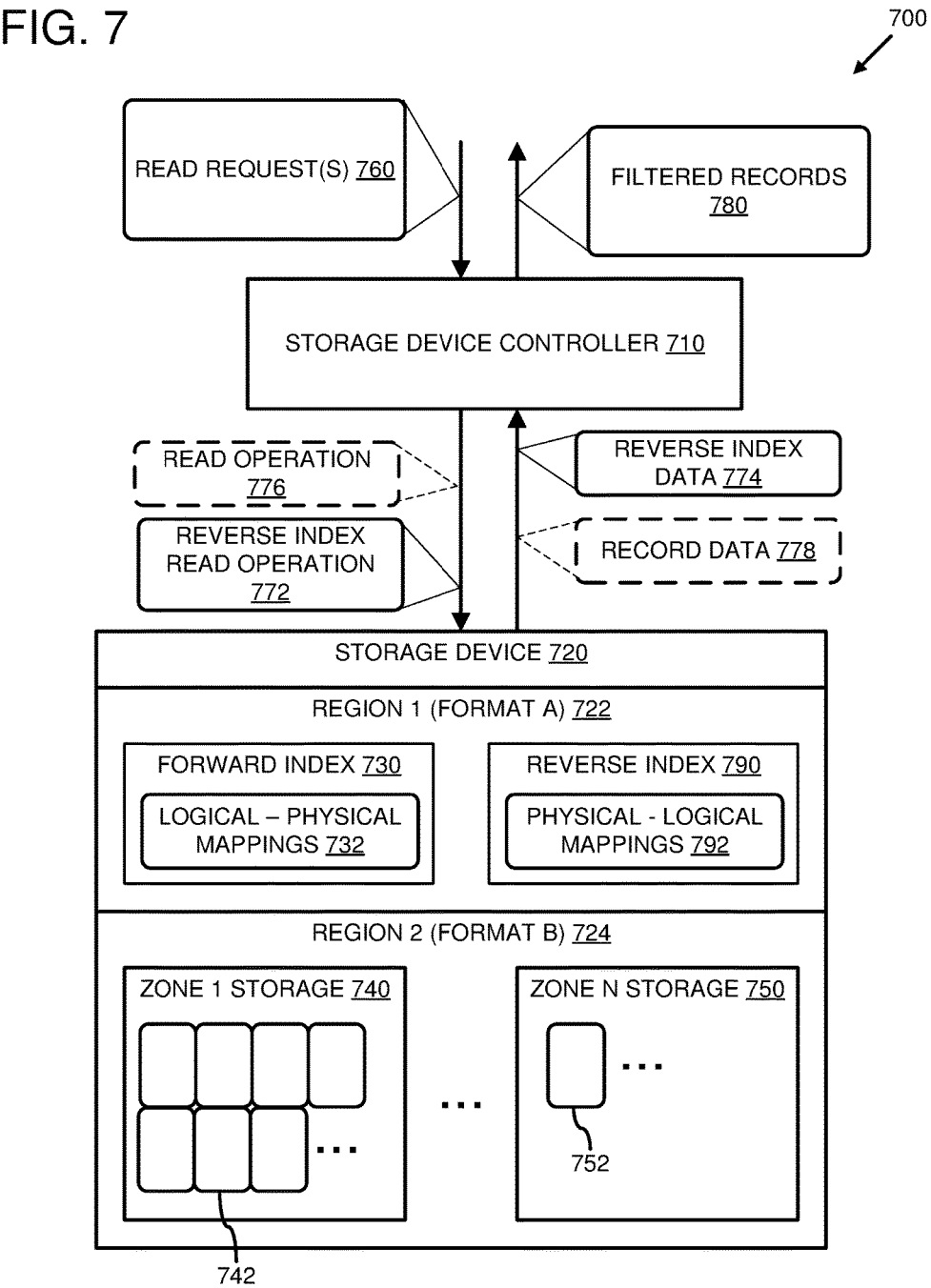
FIG. 7 is a system diagram depicting an example system configured to process read requests using a reverse index.

FIG. 7 is a system diagram depicting an example system 700 configured to process one or more read requests 760 using a reverse index 790. The example system 700 comprises a storage device controller 710 connected to a storage device 720. The storage device 720 comprises a first storage region 722 and a second storage region 724. The storage device 720 is configured to store data in the first region 722 using a first storage format (format A) and to store data in the second region 724 using a second storage format (format B).

The storage device controller 710 is configured to create and maintain two storage indexes in the first storage region 722: a forward index 730 and the reverse index 790. The forward index 730 comprises logical to physical mappings 732 that map logical record identifiers to physical storage locations in the second storage region 724 where the records associated with logical record identifiers are stored. The reverse index 790 comprises physical to logical mappings 792 that map the physical storage locations in the second storage region 724 to the logical record identifiers. In at least one embodiment, the forward index 730 and the reverse index 790 reference a common set of index entry records. In such an embodiment, the forward index 730 and the reverse index 790 represent alternative data structures for accessing index record entries using different keys. For example, an index record entry for a given record can be retrieved by using the forward index 730 to look up the index record entry using a provided logical record identifier for the record. Additionally or alternatively, the index record entry for the given record can be retrieved using the reverse index 790 by providing a storage location identifier (such as a block address and/or an extent or offset within a data block).

The storage device controller 710 is configured to process record read requests by reconciling the requested records with the reverse index 790 to determine whether one or more requested records are marked as deleted. The storage device controller 710 is configured to receive one or more requests 760 to retrieve record data from the storage device 720. A read request can comprise one or more storage location identifiers (such as block addresses and/or extents or offsets within one or more data blocks) for storage locations in the second region 724. In a particular embodiment, a read request can comprise a request to retrieve data stored in a range of storage locations in the second region 724 that are associated with a particular storage zone (e.g., 740-750). In a different or further embodiment, the one or more read requests 760 comprises multiple requests to retrieve data from a sequence of storage locations, wherein each request comprises a storage location identifier for one storage location in the sequence.

The storage device controller 710 can transmit a reverse index read operation 772 to the storage device 720 comprising one or more storage location identifiers included in the one or more record read requests 760. The one or more storage location identifiers can be used to look up one or more index record entries for one or more records using the reverse index 790. The identified one or more index record entries can be transmitted to the storage device controller 710 in the reverse index data 774. In at least one embodiment, a range of storage locations in the second region 724 that are associated with a storage zone (e.g., 740-750) can be provided in the one or more record read requests 760. In a different or further embodiment, an index entry for the storage zone that comprises index record entries for records with record data stored in one or more of the storage locations in the identified range can be retrieved using the reverse index 790.

The storage device controller 710 can analyze the reverse index data 774 to determine whether any index record entries associated with the one or more storage locations are marked as deleted. If all of the index record entries included in the reverse index data 774 are marked as deleted, the storage device controller 710 can transmit a filtered records response 780, indicating that the requested record data does not exist.

If at least one of the retrieved index record entries included in the reverse index data 774 is not marked as deleted, the storage device controller 710 can transmit a read operation 776 to the storage device 720 to retrieve record data from one or more storage locations associated with the index record entries that are not marked as deleted. The storage device 720 can transmit the requested record data 778 to the storage device controller 710 in response.

In at least one embodiment, the record read operation 776 comprises storage location identifiers associated with the index record entries that are not marked as deleted. In a further embodiment, the read operation 776 can include storage location identifiers associated with index record entries that are marked as deleted as well (or a range of storage location identifiers that includes identifiers for storage locations associated with index record entries that are marked as deleted). This can be done, for example, in cases where a sequential read operation of multiple storage locations, including one or more storage locations storing record data for records that have been marked as deleted, may be more efficient than multiple random-access read operations that would only access data in storage locations associated with records that are not marked as deleted. In such an embodiment, the storage device controller 710 can use the reverse index data 774 to filter out record data that has been marked as deleted.

The example system 700 can be advantageous in some scenarios were data is retrieved using storage location identifiers instead of logical record identifiers. The reverse index 790 can be used to determine whether physical storage locations are associated with records that are marked as deleted without first having to retrieve the record data from the physical storage locations in the second storage region 724. However, two indexes (the forward index 730 and the reverse index 790) must be maintained in the first storage region 722 of the storage device 720.

In at least some embodiments, a cache can be used to reduce a number of storage index read operations. For example, when an index record entry is retrieved from the storage index by the storage device controller, it can be cached in a separate memory or storage and retrieved from the cache on subsequent requests for the same record entry. In at least some cases, the cache can be a read-only cache or a read/write-through cache to avoid concurrency issues when the storage index is updated.

In any of the examples described herein, once certain threshold conditions have been met, storage locations that are associated with index record entries that have been marked as deleted can be reclaimed to make the storage locations available for storing additional data. In an embodiment where the storage index organizes index record entries into storage zones associated with ranges of storage locations in a separate storage region, the storage zone can be reclaimed once a certain number or percentage of the index record entries in the storage zone are marked as deleted.

Figure 8:
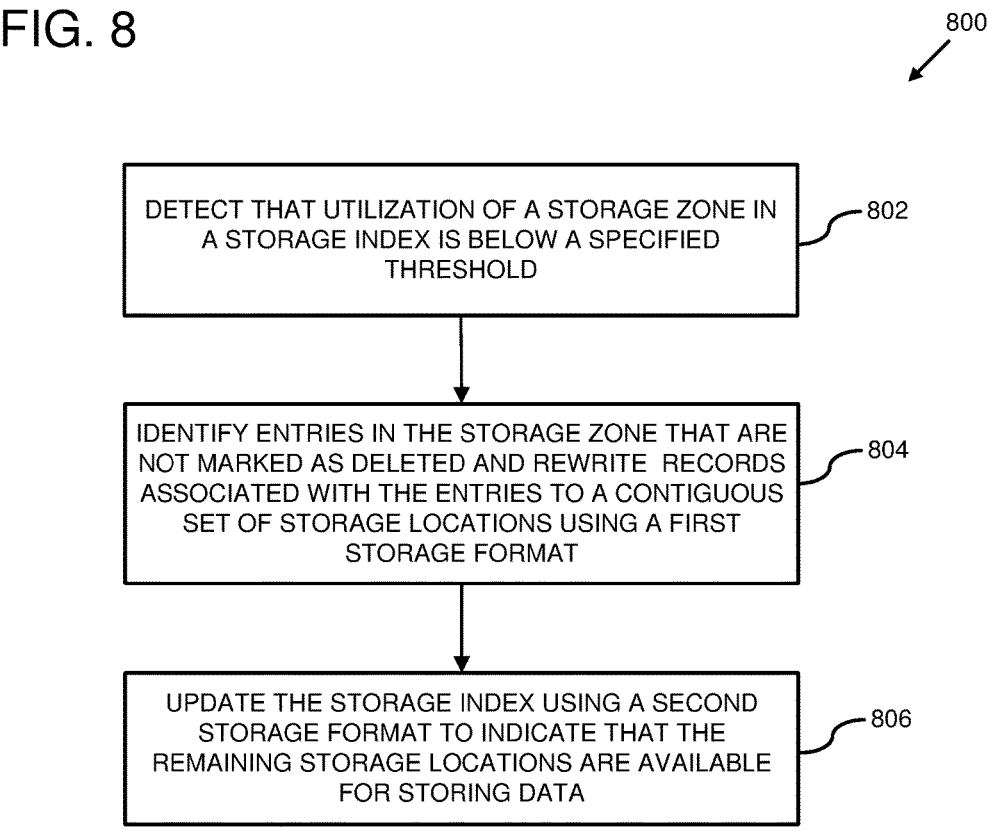
FIG. 8 is a flowchart of an example method for reclaiming a storage zone using a storage index.

FIG. 8 is a flowchart of an example method 800 for reclaiming a storage zone using a storage index. Any of the example systems described herein can be used to perform the example method 800.

At 802, it is detected that utilization of a storage zone in a storage index on one region of a storage device is below a specified threshold. The utilization of a storage zone can comprise a number and/or percentage of entries in the storage zone that are not marked as deleted. I.e., storage locations that are storing data for records that are not marked as deleted are being utilized. Whereas, storage locations storing data for records that are marked as deleted are not being utilized since they are not storing data that can be retrieved. The specified threshold can comprise a number and/or percentage that represents a minimum utilization, below which a storage zone is eligible for reclamation.

The utilization of the storage zone can be determined by inspecting the entries in the storage zone and calculating a count and/or percentage of the entries that are not marked as deleted. Additionally or alternatively, the storage zone can comprise utilization metadata that indicates a number and/or percentage of the entries in the store zone that are not marked as deleted. In such an embodiment, the utilization metadata can be used to determine the utilization of the storage zone instead of inspecting the entries in the storage zone. In at least some embodiments, the utilization metadata for the storage zone can be updated when an entry in the storage zone is marked as deleted.

At 804, entries in the storage zone that are not marked as deleted are identified, and records associated with the identified entries are rewritten to a contiguous set of storage locations in a storage region of the storage device. The entries in the storage zone that are not marked as deleted can be identified by inspecting the entries of the storage zone and separating the entries into two groups, based on whether each entry is marked as deleted or is not marked as deleted. The entries in the storage zone can associate logical identifiers for data items with storage locations in the storage region where the data items are stored. The data items associated with the entries that are not marked as deleted can be retrieved from the storage region and written to a contiguous set of storage locations in the storage region using a first storage format.

In at least one embodiment, the storage zone is associated with a range of contiguous storage locations, in which the data items associated with the storage zone's entries are stored. A contiguous subset of storage locations in this range of storage locations can be identified, and the data items associated with the entries that are not marked as deleted can be written to this subset of storage locations. In at least some cases, rewriting the data items to the subset of contiguous storage locations consolidates and separates storage locations storing utilized data items from storage locations that can be made available for storing new data items.

In a different or further embodiment, the data items associated with the entries that are not marked as deleted can be rewritten to a set of contiguous storage locations in another part of the storage region, such as at an end of the storage region. For example, the data items can be written to a contiguous set of storage locations at an end of the storage region using one or more sequential write operations. In such an embodiment, all of the storage locations that were associated with entries in the storage zone can be made available to store additional data.

At 806, the storage index in the index region is updated using a second storage format to indicate that the remaining storage locations (i.e., the storage locations that are no longer storing utilized data) associated with the storage zone are available for storing additional data. Updating the storage index can comprise adding a new storage zone to the storage index and associating the new storage zone with the remaining storage locations. The reclaimed storage zone can be updated to remove entries that were marked as deleted. Entries in the reclaimed storage zone that were not marked as deleted can be updated to associate the entries with the storage locations where the records were rewritten. The range of storage locations associated with the reclaimed storage zone can be changed to cover the contiguous set storage locations where the records associated with the undeleted entries are now stored.

Figure 9:
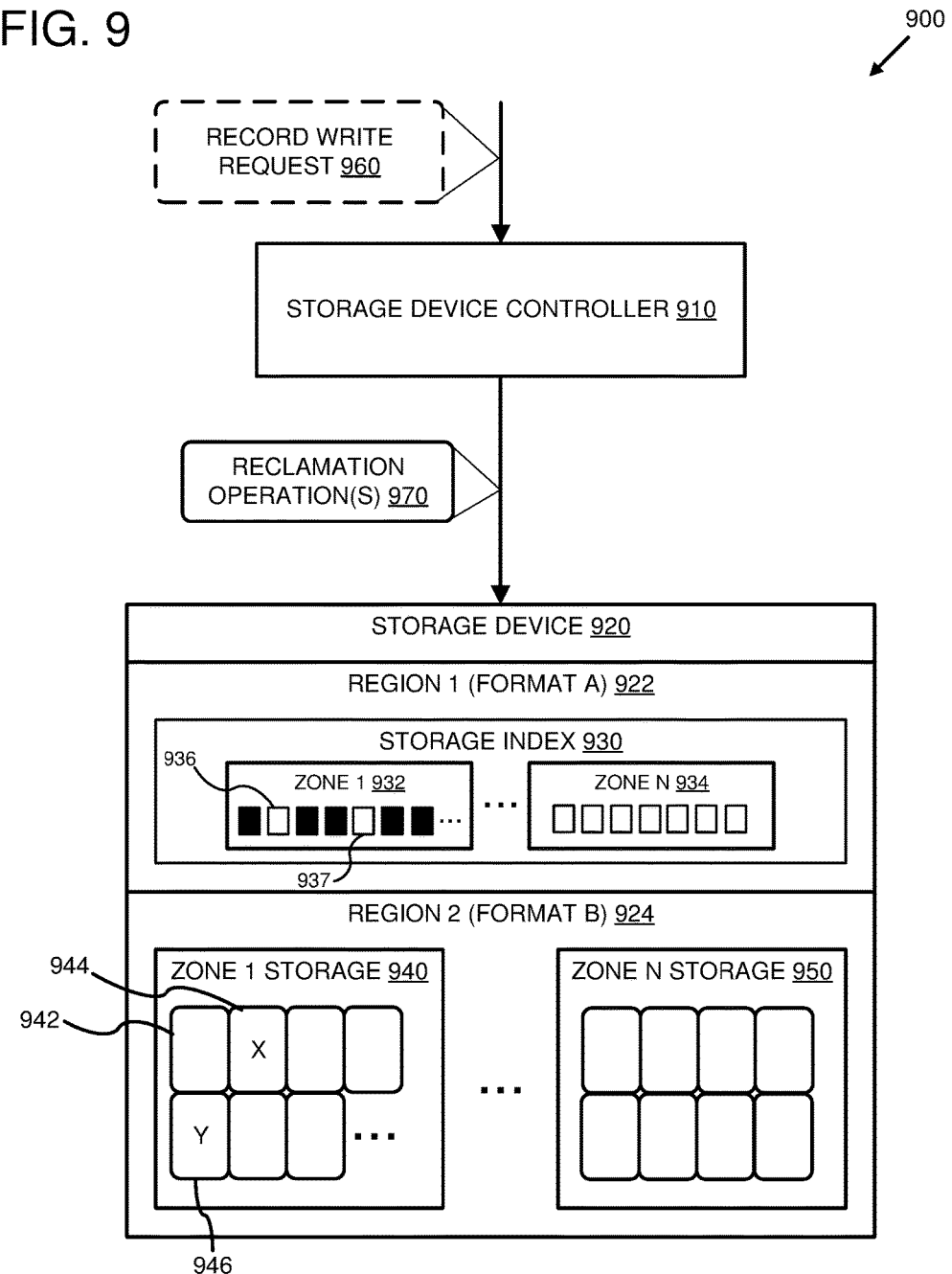
FIGS. 9-10 are system diagrams depicting an example system configured to reclaim a storage zone using a storage index.

FIG. 9 this a system diagram depicting an example system 900 configured to reclaim a storage zone (e.g., 932) using a storage index 930. The example system 900 comprises a storage device controller 910 connected to a storage device 920. The storage device 920 is configured to store data in a first storage region 922 using a first storage format (format A), and to store data in a second storage region 924 using a second, different storage format (format B). The storage device controller 910 is configured to create and maintain a storage index 930 in the first storage region 922 that associates logical identifiers for records with storage locations in the second storage region 924 where the records are stored. The storage index 930 comprises multiple storage zones 932-934 associated with ranges of storage locations 940-950 in the second storage region 924. A storage zone in the storage index 930 can comprise multiple record entries (e.g., 936 and 937) that associate logical identifiers for records with particular storage locations, within the range of storage locations 940 associated with the storage zone 932. For example, the zone 932 comprises record entries 936 and 937 which map logical record identifiers to the storage locations 944 and 946, respectively, where records associated with the logical record identifiers are stored. A record entry in the storage index 930 can indicate whether an associated record has been marked as deleted. In FIG. 9, the record entries in storage zone 932, other than the record entries 936 and 937, are depicted as being marked as deleted.

The storage device controller 910 can detect that a number of record entries associated with a storage zone that are marked as deleted is greater than or equal to a specified threshold. The storage device controller 910 can then perform one or more reclamation operations 970 to reclaim storage locations associated with the deleted records in order to make the reclaimed storage locations available for storing additional record data. For example, the storage device controller 910 can detect that the zone 932 contains a number of record entries marked as deleted that meets or exceeds the specified threshold and can transmit the one or more reclamation operations 970 to reclaim the storage locations in the second region 924 associated with the record entries that have been marked as deleted.

Optionally, the storage device controller 910 can perform the reclamation operations 970 in response to receiving a record write request 960 comprising additional record data to be written to the storage device 920. For example, the storage device controller 910, while attempting to write the record data included in the record write request 960 to the second storage region 924, may detect that insufficient storage locations are available to append the record data to the end of the storage region 924. The storage device controller 910 can then examine the storage index 930 to identify a storage zone with a sufficient number of storage locations that have been marked as deleted to store the additional record data. The storage device controller 910 can reclaim the storage locations associated with the record entries that are marked as deleted using the reclamation operations 970, and can then write the additional record data to the reclaimed storage locations.

The reclamation operations 970 can comprise instructions to rewrite record data associated with record entries that are not marked as deleted to a contiguous set of storage locations in the storage region 924 and to update the storage index 930 to reflect the new storage locations for the record entries that are not marked as deleted. The reclamation operations can further comprise instructions to update the storage index 930 to indicate that storage locations previously associated with record entries that were marked as deleted are available for storing additional data. In at least some embodiments, the contiguous set of storage locations comprises storage locations in the range of storage locations associated with the reclaimed storage zone. Additionally or alternatively, the storage locations can comprise one or more storage locations outside the range of storage locations associated with the reclaimed storage zone. The reclaimed storage zone can be updated in the storage index 930 to adjust the set of storage locations with which it is associated to include only the storage locations now associated with the rewritten records. In at least one embodiment, the remaining storage locations that were associated with the reclaimed storage zone can be associated with a new storage zone in the storage index 930.

In a particular example, the storage device controller 910 can detect that the number of record entries in the zone 932 that are marked as deleted is greater than or equal to the specified threshold. The storage device controller 910 can detect that the record entries 936 and 937 are not marked as deleted and are associated with the storage locations 944 and 946, respectively. The reclamation operations 970 can rewrite the record data stored in the storage locations 944 and 9462 contiguous storage locations (such as storage locations 942 and 944). The storage index 930 can be updated to associate the storage zone 932 with only the contiguous set of storage locations which now store the data for the record entries 936 and 937. The remaining storage locations represent a contiguous set of storage locations that can be made available to store additional record data.

Figure 10:
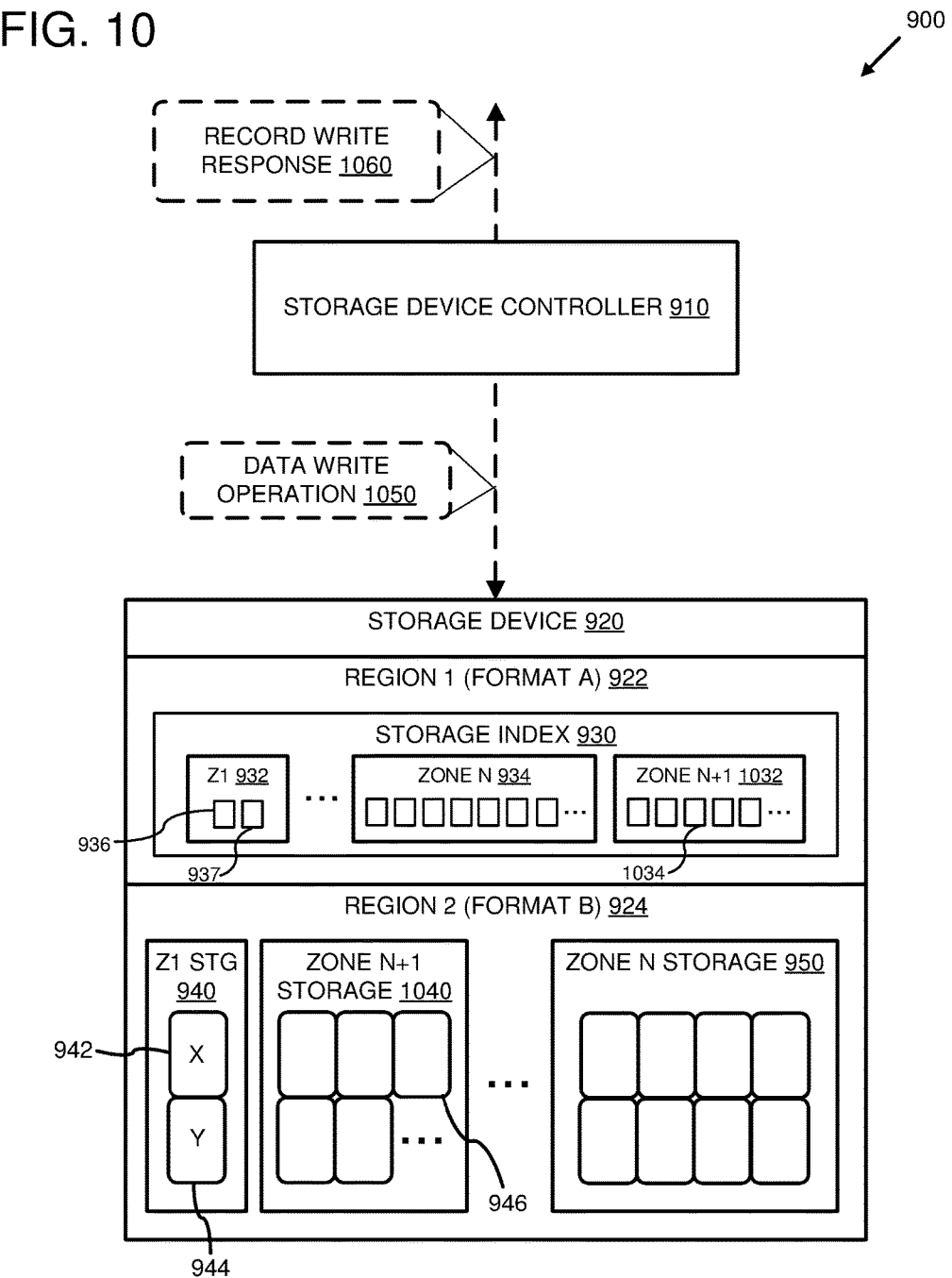

FIG. 10 as another system diagram depicting the example system 900 after reclamation operations 970 have been performed to reclaim the storage zone 932. The record data associated with the index record entries 936 and 937, which was previously stored in the storage locations 944 and 946, has been moved to the storage locations 942 and 944. The storage index 930 has been updated to change the range of storage locations associated with the storage zone 932 to include only the range of storage locations 940 associated with the record entries 936 and 937. A new storage zone 1032 has been created in the storage index 930 which is associated with the range of storage locations 1040 in the storage region 924 which were previously associated with the storage zone 932, including the storage location 946.

In at least some embodiments, the new storage zone 1032 can include new record entries (e.g., 1034) associated with the range of storage locations 1040. In a scenario where the record write request 960 was received by the storage device controller 910, the storage device controller 910 can transmit a data write operation 1050 to write the received additional record data to one or more of the storage locations associated with the newly created zone 1032. For example, some or all of the received record data can be written to the storage location 946. The record entry 1034 can be updated to associate a logical record identifier for the additional record data with the storage location 946. In at least one embodiment, the logical record identifier can be included with the record data provided by the data write request 960. Alternatively, the logical record identifier can be generated by the storage device controller 910 as part of the data write operation 1050. In such an embodiment, the storage device controller 910 can transmit a record write response 1060 that comprises the generated logical record identifier associated with the record data.

In at least some embodiments, a logical record identifier comprises an identifier associated with a zone and an identifier associated with a record entry within the zone. In such embodiments, a storage location in the second storage region 924 with which a record entry is associated can be changed without affecting the logical record identifier associated with the record. For example, the storage location with which the record entry 937 is associated was changed from the storage location 946 to the storage location 944. However, since the record entry 937 remained associated with the storage zone 932, the logical record identifier associated with the record entry 937 can remain the same.

Figure 11:
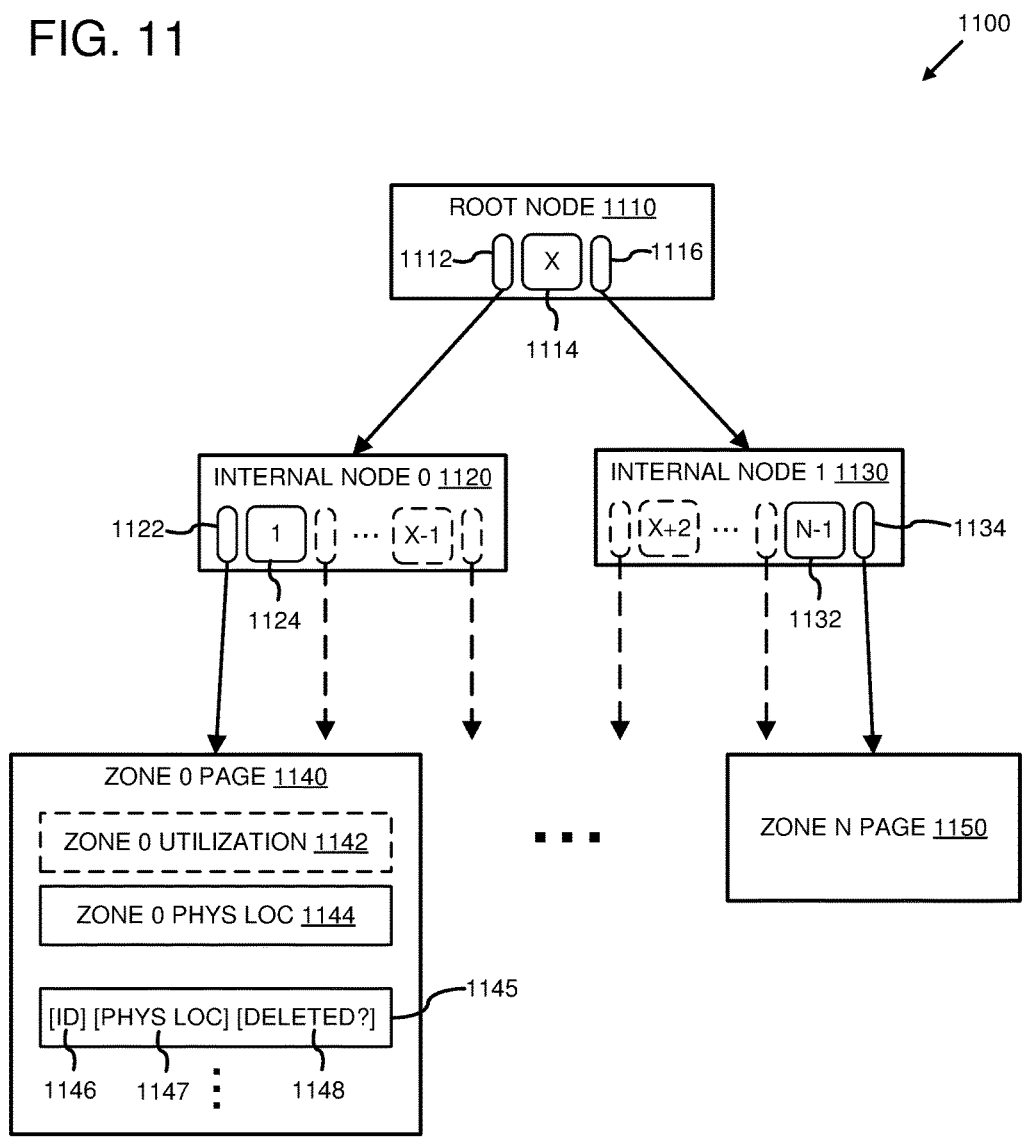
FIG. 11 is a diagram depicting an example storage index comprising a b-tree.

FIG. 11 is a diagram depicting an example storage index 1100 comprising a b-tree data structure for organizing and accessing record entries. The example storage index 1100 can be used as a storage index in any of the example systems described herein.

The example storage index 1100 comprises a root node 1110 with pointers 1112 and 1116 to internal nodes 1120 and 1130, which in turn have pointers 1122-1134 to storage zone pages 1140-1150. The root node 1110 includes a key 1114 that comprises a value that is used to divide the sub-trees of the root node 1110. The value in the key 1114 can be compared to an input key value, such as an identifier associated with a storage zone. If the input key value is less than or equal to the value in the key 1114, then the pointer 1112 can be used to retrieve the internal node 1120. If the input key value is greater than the value in the key 1114 then the pointer 1116 can be used to retrieve the internal node 1130. For the sake of simplicity, the root node 1110 is depicted as containing a single key 1114, which separates two pointers 1112 and 1116. However, in at least some embodiments it is possible for the root node 1110 to contain multiple keys which separates three or more pointers to three or more internal nodes.

The internal nodes 1120 and 1130 include keys (e.g., 1124 and 1132) that separate the pointers (e.g., 1122 and 1134) to the storage zone pages 1140-1150. When a new storage zone page is added to the b-tree, a pointer to the new storage zone page can be added to an internal node and one or more additional keys can be added to the internal node to separate the newly added pointer from other pointers in the internal node. In at least some embodiments, a maximum number of keys that an internal node can contain can be specified. In such an embodiment, when adding a new key to an internal node would cause the number of keys in the internal node to exceed the maximum number allowed, a new internal node can be added to the b-tree. IN at least some cases, this can cause the b-tree can be rebalanced.

The storage zone pages 1140-1150 serve as the leaf nodes for the b-tree in the example storage index 1100. A storage zone page can identify a range of storage locations in a storage region of a storage device that are associated with a storage zone. Additionally or alternatively, the storage zone page can contain entries that associate logical identifiers for data items with physical storage locations, in the range of storage locations associated with the storage zone, where the data items are stored. In at least some embodiments, the storage index 1100, and the storage zone pages 1140-1150, are stored in an index region of the storage device using a first storage format and the data items are stored in the physical storage locations of the storage region of the storage device using a second storage format.

The storage zone page 1140 comprises a physical storage location value 1144 that identifies a range of contiguous storage locations in a storage region of a storage device. In at least one embodiment, the physical storage location value 1144 comprises a storage location identifier (such as a data block address, an extent within a data block, etc.) and a number of contiguous physical storage locations, beginning with the storage location associated with the storage location identifier, that are associated with the storage zone. Alternatively, the physical storage location value 1144 can comprise two storage location identifiers that represent a beginning and an end, respectively, of the range of contiguous storage locations associated with the storage zone.

The storage zone page 1140 contains one or more entries (e.g., 1145) that associate logical identifiers for data items with physical storage locations where the data items are stored. An entry in a storage zone page can also contain a value that indicates whether a data item associated with the entry is marked as deleted. For example, the entry 1145 contains a logical identifier for a data item 1146, a physical storage location identifier 1147, and a value 1148 that indicates whether the data item is marked as deleted.

In at least some embodiments, the logical identifier 1146 can comprise an alphanumeric value that uniquely identifies the data item. In a different or further embodiment, the logical identifier 1146 can comprise an offset into a list of entries in the storage zone page 1140. In such an embodiment, a data item can be uniquely identified by a combination of the identifier 1146 and an identifier associated with the storage zone. For example, if the storage zone page 1140 is associated with a storage zone with an identifier, "0," and the entry 1145 is a first entry in the list of entries in the storage zone page 1140, then a logical identifier with a value such as "0.0" can identify the data item associated with the entry 1145.

The physical storage location identifier 1147 can comprise a data block address and/or an extent or offset within a data block. In at least some embodiments, the deletion marker 1148 comprises a Boolean value. For example, a value of 0 can indicate that the entry 1145 is not marked deleted, and a value of 1 can indicate that the entry is marked as deleted.

A target storage zone page can be retrieved from the storage index 1100 by comparing an input key value to one or more keys in one or more nodes of the b-tree. For example, the root node 1110 can be retrieved and the value of the key 1114 can be compared to the input key value. For the purposes of this example, assume that an input key value of "0" is provided and that the input key value of "0" is less than or equal to the key 1114's value of "X." Since the input value is less than or equal to the value of the key 1114, the pointer 1112 is used to retrieve the internal node 1120. The input key value is compared to the one or more keys in the internal node 1120. Since the input key value of "0" is less than the key 1124's value of "1," the pointer 1122 is used to retrieve the storage zone page 1140.

In at least one embodiment, a logical identifier for a data item is provided as input for searching the example storage index 1100, wherein the logical identifier comprises a storage zone identifier and an index entry identifier. In such an embodiment, the storage zone identifier can be used as an input key value to retrieve a storage zone page, of the storage zone pages 1140-1150, that is associated with the identified storage zone. The index entry identifier can then be used to locate an entry within the retrieved storage zone page that is associated with the data item.

In another embodiment, a storage location identifier is provided as input for searching the example storage index 1100, wherein the storage location identifier is associated with a storage location where a data item is stored. In such an embodiment, the storage location identifier can be used as an input key value to retrieve a storage zone page, of the storage zone pages 1140-1150 that is associated with a range of storage locations that includes the identified storage location. For example, the keys in the b-tree nodes (1114, 1124, 1132, etc.) can be based on identifiers for storage locations at the ends of the storage zone storage location ranges, such that an input storage location identifier will be routed to the page for the storage zone whose storage location range includes the identified storage location. An entry in the retrieved storage zone page that is associated with the input storage location identifier can then be located.

Optionally, a storage zone page can include a zone utilization metric (e.g., 1142) that indicates a utilization level of a storage zone. In at least some embodiments, the utilization metric can include a number and/or percentage of entries in the storage zone page that are not marked as deleted. The utilization metric can be updated when an entry in the storage zone page is marked as deleted. The utilization metric can be used to determine whether the range of physical storage locations associated with the storage zone can be reclaimed. For example, the utilization metric can be compared to a specified threshold and the range of storage locations associated with the storage zone can be reclaimed if the utilization level is less than or equal to the specified threshold.

A b-tree, such as the one depicted in FIG. 11, can balance access to record entries by keeping the leaf nodes (i.e., the storage zone pages) at a same depth. The depth of the storage zone pages may increase gradually as additional zone pages are added to the tree. Increasing the number of keys stored within each internal node of the b-tree can decrease the depth of the b-tree, thus reducing the number of nodes that must be accessed to locate a target storage zone page. In at least one embodiment, a maximum number of keys stored within each internal node can be selected that will make a maximum size of each internal node equal to a storage device's data block size. In such an embodiment, the root node and internal nodes of the storage index 1100 can be stored in separate data blocks in a storage region of the storage device. This can be advantageous in some scenarios, since a number of data block read operations that are necessary to access a storage zone page will be the same for all storage zone pages in the storage index 1100.

The example storage index 1100 is provided for illustration purposes and is not intended to be limiting. Other types of storage indexes are also possible.

Figure 12:
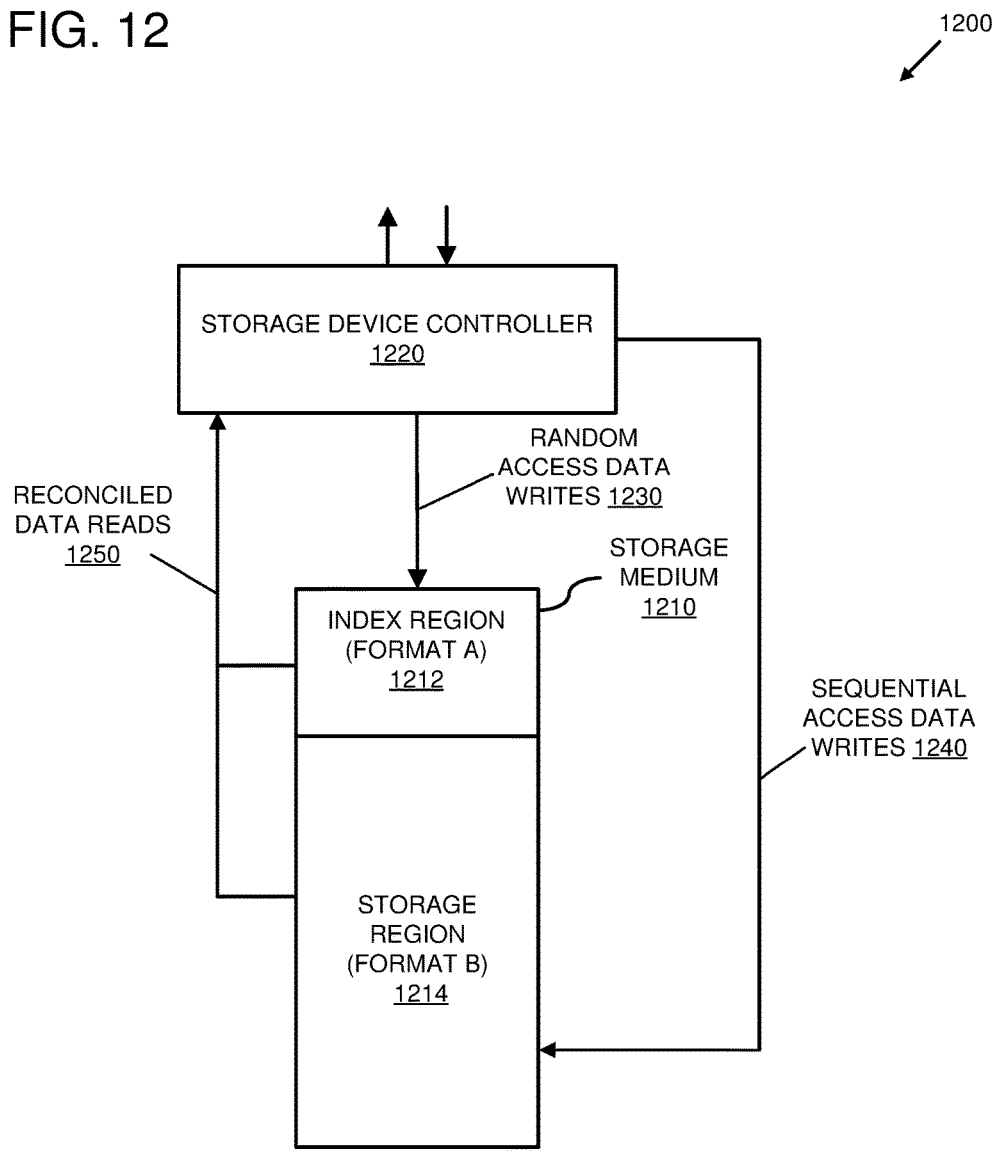
FIG. 12 is a system diagram depicting an example storage device comprising an index region and a storage region.

FIG. 12 is a system diagram depicting an example storage device 1200 comprising a storage medium 1210 with an index region 1212 and a storage region 1214. The example storage device 1200 can be used as a storage device in any of the example systems described herein.

The storage device 1200 comprises a storage device controller 1220 configured to receive data access operation requests to read and/or write data and to perform the requested operations by writing data to the storage medium 1210 and reading data from the storage medium 1210. The storage device controller 1220 is configured to create and maintain a storage index (not shown) in the index region 1212 in a storage format A using techniques described herein.

The data access operations comprise random-access data writes 1230. The storage device controller 1220 is configured to perform the random-access data writes 1230 by modifying the storage index in the index region 1212. In different or further embodiments, the data access operations further comprise sequential access data writes 1240. In such embodiments, the storage device controller 1220 can be configured to write sequentially addressed data blocks to storage locations in the storage region 1214 of the storage medium 1210 and to associate the storage locations with logical record identifiers in the storage index in the index region 1212.

The storage device controller 1220 is configured to store data in the storage region 1214 using a different storage format B. In at least some embodiments, the storage format A can be a PMR format and the storage format B can be an SMR storage format. In some cases, performance of random-access data writes is better when using a PMR format than when using an SMR format. However, data can often be stored more densely using an SMR format than a PMR format.

In another embodiment, the storage format A can be an SLC storage format and the storage format B can be an MLC format. In some cases, write endurance is better when using an SLC forma than when using an MLC format. However, data can often be stored more densely using an MLC format than an SLC format.

The storage device controller 1220 is further configured to perform data reads 1250 by reading data from the storage region 1214 and reconciling the data with the storage index in the index region 1212. When a read data access operation is received by the storage device controller 1220, the storage device controller 1220 can check to see if an entry in the storage index associated with the requested data is marked as deleted. If the entry is marked as deleted, then the storage device controller 1220 can response to the data read request with a message indicating that the requested data does not exist. If the entry is not marked as deleted, the storage device controller 1220 can transmit the requested data in response to the data read request.

Figure 13:
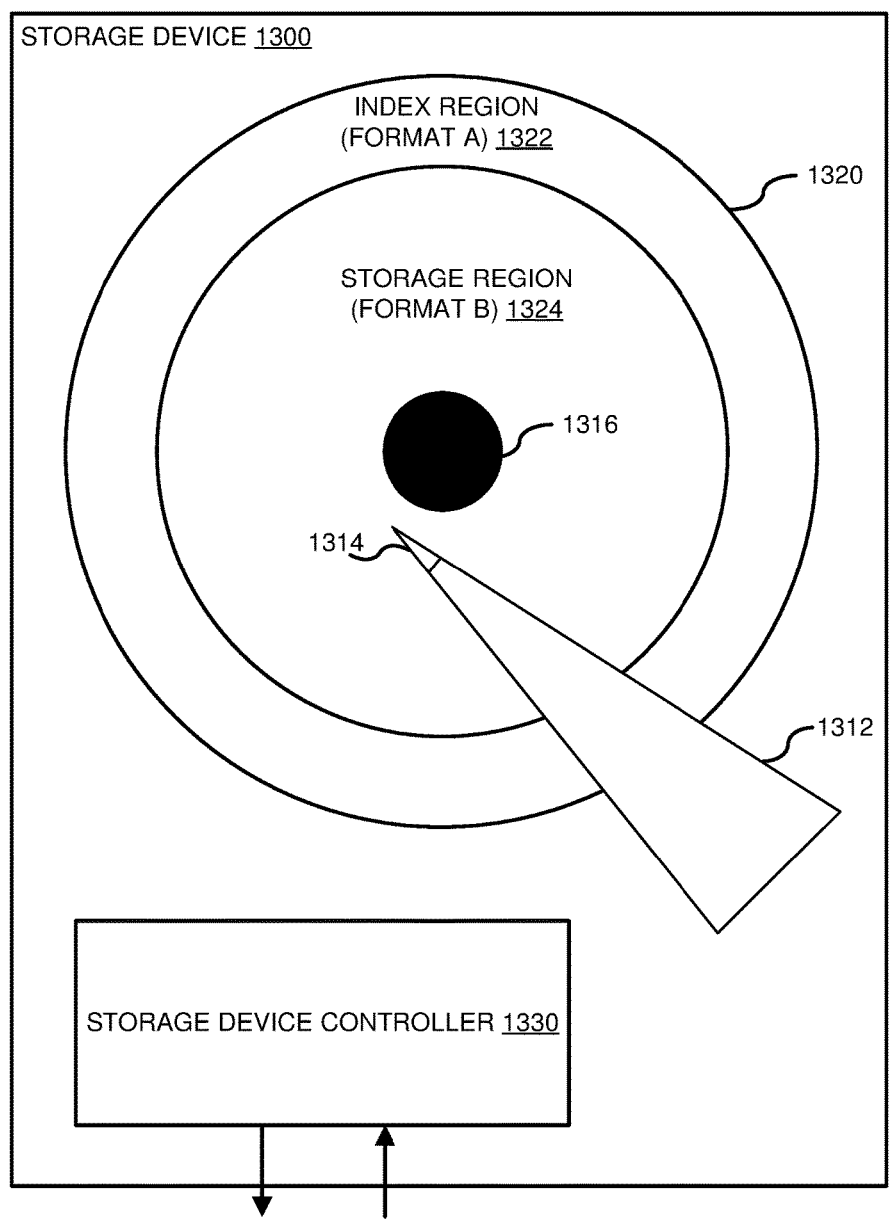
FIG. 13 is a system diagram depicting an example storage device comprising a magnetic disk comprising an index region and a storage region.

FIG. 13 is a system diagram depicting an example storage device 1300 comprising a magnetic disk 1320 comprising an index region 1322 and a storage region 1324. The storage device 1300 can be used as a storage device in any of the examples described herein.

The storage device 1300 comprises a magnetic disk 1320 that can be rotated on a spindle 1316. The storage device 1300 also comprises a moveable actuator arm 1312 with a read/write head 1314. The actuator arm 1312 can be rotated on an actuator axis (not shown) by an actuator (not shown) to move the read/write head 1314 over different portions of the magnetic disk 1320. The storage device 1300 is configured to write data to and to read data from the magnetic disk 1320 using the read/write head 1314. The read/write head 1314 can comprise a single head that can perform both read and write operations. Alternatively, the read/write head 1314 can comprise two separate heads for reading and writing, respectively. The storage device 1300 can be configured to use the read/write head 1314 to write data to the magnetic disk 1320 in multiple concentric circular tracks as the magnetic disk is rotated on the spindle 1316.

A storage device controller 1330 can process write and read access commands sent to the storage device 1300 to write data to and read data from the storage medium 1320. The storage device controller 1330 can specify a location on the magnetic disk 1320 at which the data is to be written or from which the data is to be read. For example, each unit of data stored on the magnetic disk 1320 can have a unique address, such as a block address and/or extent within a data block, which identifies the location on the magnetic disk 1320 where it is stored.

The read/write head 1314 can be configured to write data to the magnetic disk 1320 using two different storage formats. The storage device controller 1330 can specify which storage format is to be used when reading or writing the data. The storage device controller 1330 can do this, for example, by switching a storage format mode of the read/write head 1314.

The storage device controller 1330 can designate separate regions on the magnetic disk 1320, on which data can be stored using the two separate storage formats supported by the read/write head 1314. In FIG. 13, for example, an index region 1322 is designated by the storage device controller 1330 comprising one or more of the outermost circular tracks of the magnetic disk 1320. A storage index (not shown) can be created and maintained in the index region 1322 using a first storage format (format A). A storage region 1324 is designated by the storage device controller 1330 comprising the remaining inner circular tracks of the magnetic disk 1320. Data is stored in the storage region 1324 using a second storage format (format B).

The determination of which storage format to use for which region can be based on a desired storage capacity and/or a desired data access performance for each region. For example, a storage format with relatively high random data write performance but relatively low storage density may be selected for the index region 1322. A storage format with relatively high storage density but relatively low random data write performance may be selected for the storage region 1324.

In some circumstances, designating the outermost portion of the magnetic disk 1320 as the index region 1322 can be preferable since, as the magnetic disk 1320 rotates, the storage index can be read at a faster rate from the outermost tracks of the magnetic disk 1320 than from the inner tracks of the magnetic disk 1320. Other locations on the magnetic disk 1320 for the index region 1322 and the storage region 1324 are also possible.

The storage device controller 1330 is configured to receive requests to write data to and read data from the storage device 1300. The storage device controller 1330 is configured to perform random-access write operations by modifying the storage index in the index region 1322. The storage device controller 1330 can be configured to write new data sequentially to storage locations in the storage region 1324 of the storage medium 1210 and to associate the storage locations with logical record identifiers in the storage index in the index region 1322.

The storage device controller 1330 is configured to update the storage index in the index region using the storage format A and to store data in the storage region 1324 using the storage format B. In at least some embodiments, the storage format A can be a PMR format and the storage format B can be an SMR storage format. In some cases, performance of random-access data writes is better when using a PMR format than when using an SMR format. However, data can often be stored more densely using an SMR format than a PMR format.

The storage device controller 1330 is further configured to perform data read operations by retrieving data from the storage region 1324 and reconciling the data with the storage index in the index region 1322. When a read data access operation is received by the storage device controller 1330, the storage device controller 1330 can check to see if an entry in the storage index associated with the requested data is marked as deleted. If the entry is marked as deleted, then the storage device controller 1330 can respond to the data read request with a message indicating that the requested data does not exist. If the entry is not marked as deleted, the storage device controller 1330 can transmit the requested data in a data read operation response.

In some embodiments, the storage device controller 1330 must specify a storage format when writing data to the magnetic disk 1320, but not when reading data from the magnetic disk 1320. For example, read/write head 1314 may use different modes for writing data in the different storage formats, but it may be able to read data stored in either format using a single read mode.

Figure 14:
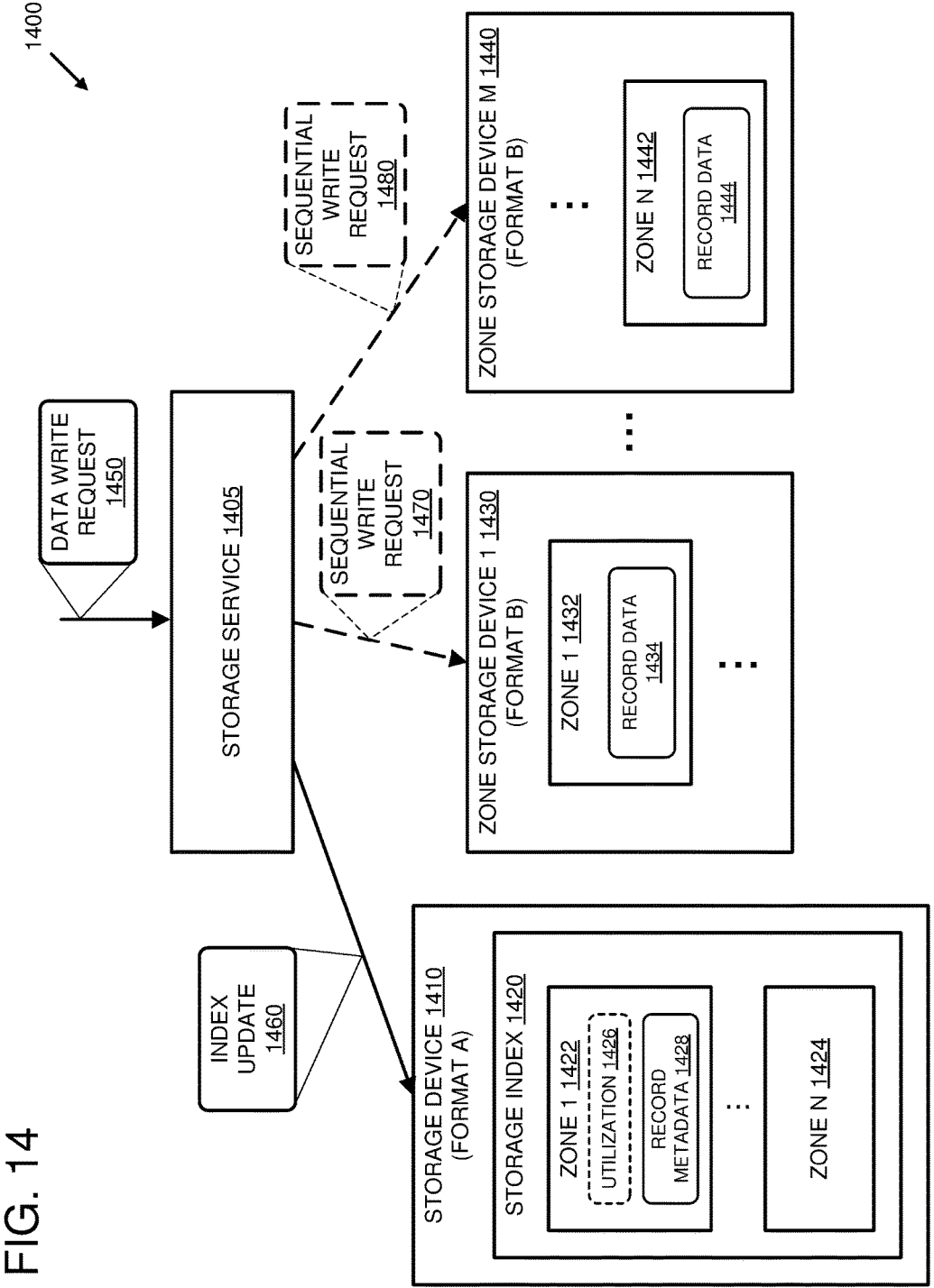
FIG. 14 is a system diagram depicting an example system comprising a storage service connected to an index storage device and multiple zone storage devices.

FIG. 14 is a system diagram depicting an example system 1400 comprising a storage device 1410 comprising a storage index 1420 and multiple zone storage devices 1430-1440 comprising record data 1434-1444. The storage device 1410 is configured to store the storage index 1420 using a first storage format (format A). The zone storage devices and 1430-1440 are configured to store record data (e.g., 1434 and 1444) using a second storage format (format B).

Although the storage index 1420 is depicted in FIG. 14 as being stored on a single storage device 1410, in at least some embodiments the storage index 1420 can be distributed across multiple storage devices. For example, portions of the storage index 1420 can be sharded and/or stored redundantly across multiple storage devices. In at least some cases, distributing the storage index 1420 across multiple storage devices can reduce access time and/or improve reliability.

The storage index 1420 comprises entries for multiple storage zones 1422-1424 that are associated with ranges of storage locations in the zone storage devices 1430-1440. An entry for a storage zone can comprise record metadata that describes associations between storage locations in the range of storage locations associated with the zone and logical identifiers for records stored in the storage locations. For example, the storage zone entry 1422 comprises record metadata 1428 that associates logical identifiers for records with storage locations in the range of storage locations 1432 which store data for the records 1434 in the zone storage device 1430.

The storage service 1405 is configured to receive a data write request 1450 and to process the data write request, at least in part, by transmitting an index update operation 1460 to the storage device 1410. In at least one embodiment, the data write request 1450 comprises a request to delete a data record. In such an embodiment, the index update 1460 can comprise one or more instructions to locate a zone entry in the storage index 1420 that contains record metadata for the record that is to be deleted, and to update the record metadata in the zone entry to indicate that the record is deleted.

In a different or further embodiment, the data write request 1450 can comprise a request to create a new record. In such an embodiment, the storage service 1405 can transmit a sequential write request to one of the zone storage devices 1430-1440 (e.g., 1470 or 1480) to write record data for the new record to one or more of the zone storage device's storage locations. The index update operation 1460 can comprise one or more instructions to update the record metadata for a zone entry in the storage index 1420 and/or to create a new zone entry in the storage index 1420. For example, if the record data is written to one or more storage locations that are currently associated with an existing zone entry in the storage index 1420, then the record metadata for the existing zone entry can be updated to associate a logical identifier for the created record with the one or more storage locations where the record data is stored. Alternatively, if the record data is written to one or more storage locations that are not associated with an existing zone entry in the storage index 1420, then a new zone entry can be added to the storage index 1420 that is associated with a range of storage locations including the one or more storage locations where the record data was written. Record metadata can be added to the newly created zone entry that associates a logical identifier for the created record with the one or more storage locations where the record data is stored.

In a different or further embodiment, the data write request 1450 can comprise a request to create an updated version of an existing record. In such an embodiment, the storage service 1405 can transmit a sequential write request to one of the zone storage devices 1430-1440 (e.g., 1470 or 1480) to write record data for the new version of the record to one or more of the storage devices storage locations. The index update operation 1460 can comprise one or more instructions to update the record metadata for a zone entry in the storage index 1420 and/or to create a new zone entry in the storage index 1420. Additionally, the index update operation 1460 can comprise one or more instructions to update record metadata for a zone entry to mark the previous version of the record as deleted.

A sequential write request (such as the sequential write request 1470 or the sequential write request 1480) can be processed by a zone storage device by appending record data provided in the sequential write request to an end of the zone storage device. Appending the record data to the end of the zone storage device can comprise locating a last storage location in the zone storage device that contains record data and writing the provided record data to one or more sequential storage locations after the located storage location.

In some scenarios, there may not be a sufficient number of available storage locations at the end of the zone storage device to store the provided record data. In such a scenario, the storage service 1405 can inspect the storage index 1420 to identify a zone entries whose storage locations can be reclaimed. Reclaiming the storage locations for a zone entry can comprise identifying storage locations that contain record data that is marked as deleted in the record metadata for the zone entry, consolidating the record data that is not marked as deleted into a contiguous sequence of storage locations, an writing the provided record data to one or more of the remaining storage locations that were associated with the zone entry. In at least some embodiments, the remaining storage locations (including the one or more storage locations that now contain the provided record data) can be associated with a new zone entry in the storage index 1420.

Optionally, a zone entry in the storage index 1420 can include utilization data (e.g., 1426) that indicates a percentage of the storage locations associated with the zone entry that are storing records that are not marked as deleted. For example, the zone entry 1422 can include the utilization data 1426 that indicates a number and/or percentage of the record entries in the record metadata 1428 that are not marked as deleted. The storage service 1405 can inspect the utilization data 1426 to determine whether or not the zone 1422 can be reclaimed. For example, if the utilization data 1426 indicates that the number and/or percentage of the record entries in the record metadata 1428 that are not marked as deleted is less than or equal to a specified threshold, the storage service 1405 can determine that the storage locations associated with the zone entry 1422 can be reclaimed.

Figure 15:
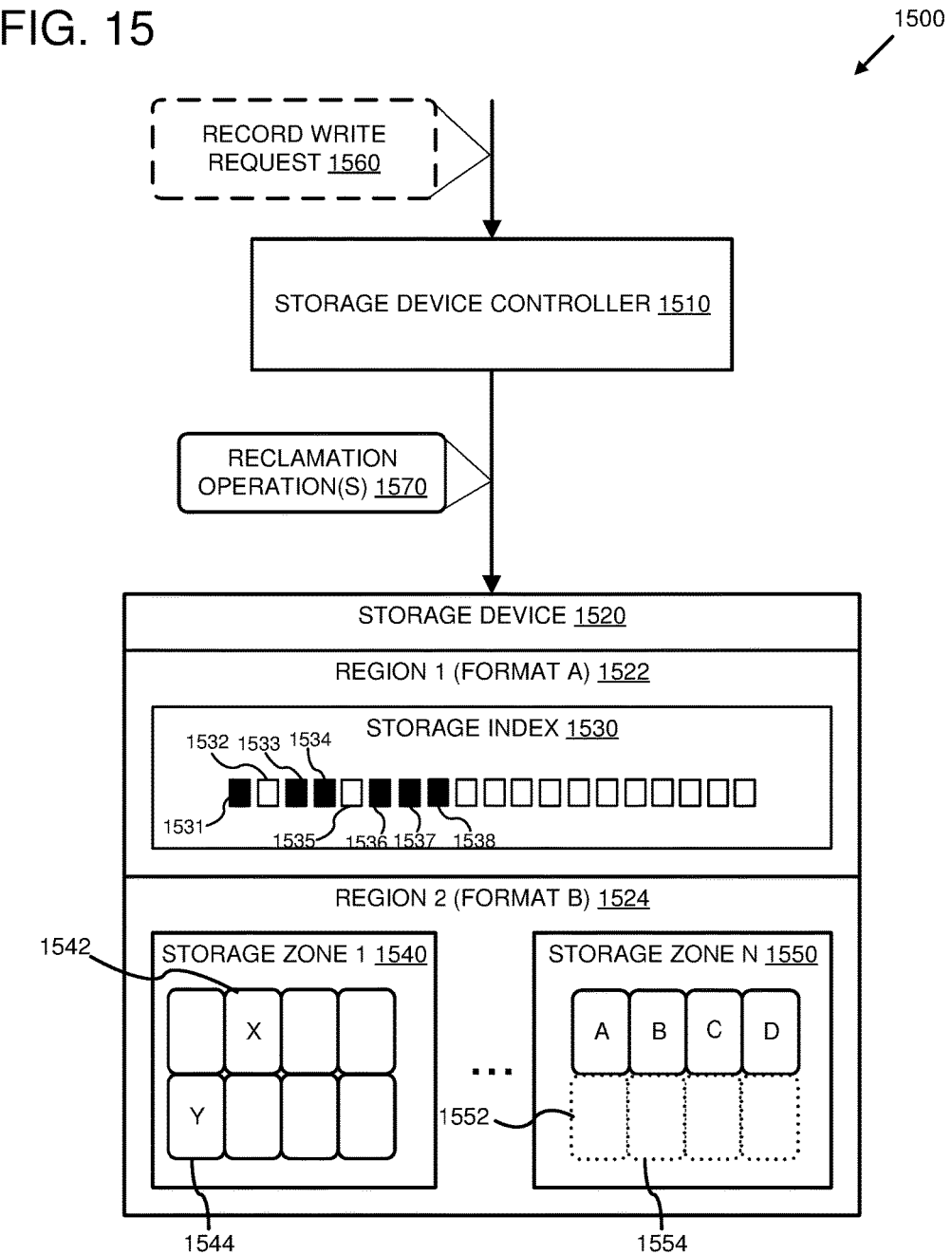
FIGS. 15-16 are system diagrams depicting an example system configured to reclaim a storage zone using a storage index.

FIG. 15 is a system diagram depicting an example system 1500 configured to reclaim a storage zone (e.g., 1540) using a storage index 1530. The example system 1500 comprises a storage device controller 1510 connected to a storage device 1520. The storage device 1520 is configured to store data in a first storage region 1522 using a first storage format (format A), and to store data in a second storage region 1524 using a second, different storage format (format B). The storage device controller 1510 is configured to create and maintain a storage index 1530 in the first storage region 1522 that associates logical identifiers for records with storage locations in the second storage region 1524 where the records are stored. The index 1530 comprises multiple record entries (e.g., 1531-1538) that map logical identifiers for records to storage locations (e.g., 1542 and 1544) where the records are stored in the second storage region 1524. For example, the record entries 1532 and 1535 map logical record identifiers to the storage locations 1542 and 1544, respectively, where records associated with the logical record identifiers are stored. An entry in the storage index 1530 can indicate whether an associated record has been market as deleted. In FIG. 15, the record entries 1531, 1533, 1534, and 1536-1538 are depicted as being marked as deleted.

The second storage region 1524 is organized into multiple storage zones 1540-1550, comprising one or more storage locations. For example, the storage zone 1540 comprises multiple storage locations, including the storage locations 1542 and 1544; and the storage zone 1550 comprises multiple storage locations, including storage locations 1552 and 1554. The storage locations 1552 and 1554 are depicted in FIG. 15 as being available for storing data. The number of storage locations depicted within the storage locations 1540-1550 in FIG. 15 is provided for illustration purposes and is not intended to be limiting. Other numbers of storage locations are possible. In at least some embodiments, the storage locations 1540-1550 can contain a same or similar number of storage locations.

In a particular embodiment, the second storage region 1524 is formatted using an SMR storage format and the storage zones 1540-1550 are SMR storage zones. The SMR storage zones can be of a same or similar size. In at least some embodiments, the storage device 1520 is configured to update data stored in a storage zone by reading all of the data stored in the storage zone, performing the update by modifying at least part of the read data, and then writing all of the data, including the modified data, back to the storage zone in the second storage region 1524.

The storage device controller 1510 can detect that a number of record entries associated with storage locations in a storage zone are marked as deleted and that the number of deleted entries is greater than or equal to a specified threshold. The storage device controller 1510 can then perform one or more reclamation operations 1570 to reclaim the storage zone to make the storage locations of the storage zone available for storing additional record data. For example, the storage device controller 1510 can detect that the storage index 1530 contains a number of record entries (1531, 1533, 1534, and 1536-1537) associated with storage locations in the storage zone 1540 that are marked as deleted. The storage device controller 1510 can determine that the number of entries that are marked as deleted meets or exceeds the specified threshold. The storage device controller 1510 can then transmit the one or more reclamation operations 1570 to the storage device 1520 to reclaim the storage zone 1540.

Optionally, the storage device controller 1510 can perform the reclamation operations 1570 in response to receiving a record write request 1560 comprising additional record data to be written to the storage device 1520. For example, the storage device controller 1510, while attempting to write the record data included in the record write request 1560 to the second storage region 1524, may detect that insufficient storage locations are available to sequentially append the record data to a storage zone at an end of the second storage region 1524. The storage device controller 1510 can then examine the storage index 1530 to identify one or more storage zone with a sufficient number of storage locations that have been marked as deleted to store the additional record data.

Additionally or alternatively, utilization metrics for each of the storage zones 1540-1550 can be stored in a separate data structure and examined to identify a storage zone with a utilization below a specified threshold. For example, a utilization value can be tracked for each storage zone that indicates a number of storage locations in the storage zone that are currently storing un-deleted data. When a record entry in the storage index 1530 is marked as deleted, a storage zone can be identified that contains the storage location associated with the record entry. A utilization value associated with the located storage zone can then be decremented. The decremented utilization value can then be compared to the specified threshold to determine whether the storage zone now has a low enough utilization to justify reclaiming the storage zone.

The storage device controller 1510 can reclaim the storage locations in the storage zone using the reclamation operations 1570. Additional record data can then be written to one or more of the reclaimed storage locations.

The reclamation operations 1570 can comprise instructions to rewrite record data associated with record entries that are not marked as deleted to storage locations in another storage zone, and to update the record entries to reflect the new storage locations for the record entries that are not marked as deleted. The reclamation operations 1570 can further comprise one or more instructions to update the storage index 1530 to remove the record entries that are marked as deleted and that are associated with storage locations in the storage zone. In a different or further embodiment, a data structure storing utilization metrics for the storage zones 1540-1550 can be updated to indicate that the reclaimed storage zone is available for storing additional data.

In a particular example, the storage device controller 1510 can detect that the number of record entries associated with storage locations in the storage zone 1540 that are marked as deleted is greater than or equal to the specified threshold (and/or that a utilization metric for the storage zone 1540 is below a specified threshold). The storage device controller 1510 can detect that the record entries 1532 and 1535 are not marked as deleted and are associated with the storage locations 1542 and 1544, respectively. The reclamation operations 1570 can rewrite the record data stored in the storage locations 1542 and 1544 to storage locations in another storage zone (such as the storage locations 1552 and 1554 in the storage zone 1550). The storage index 1530 can be updated to remove the record entries that are marked as deleted (1531, 1533, 1534, and 1536-1538) and/or to associate the record entries 1532 and 1535 with the storage locations 1552 and 1554, respectively.

In a particular embodiment, the storage device controller 1510 can monitor an available capacity of the storage device 1520 to ensure that at least one storage zone in the second storage region 1524 remains free, and that at least two other storage zones in the second storage region 1524 have utilizations of less than or equal to their storage zone sizes. In such an embodiment, when the storage device controller 1510 determines that a reclamation operation needs to be performed, the storage device controller 1510 can transmit one or more commands to the storage device 1520 to move the data stored in the two other storage zones to the free storage zone, and to mark the two other storage zones as available for storing additional data. Record entries for the moved record data in the storage index 1530 can be updated reflect the new storage locations where the data are now located. Such a configuration can be advantageous in scenarios where modifying data in a storage zone requires all of the data in the storage zone to be read, modified, and re-written to the zone. In such scenarios, using this configuration can avoid these expensive modification operations because the un-deleted data can be read from the two other storage zones and written directly to the free storage zone without having to modify any storage zone that currently contains data.

Figure 16:
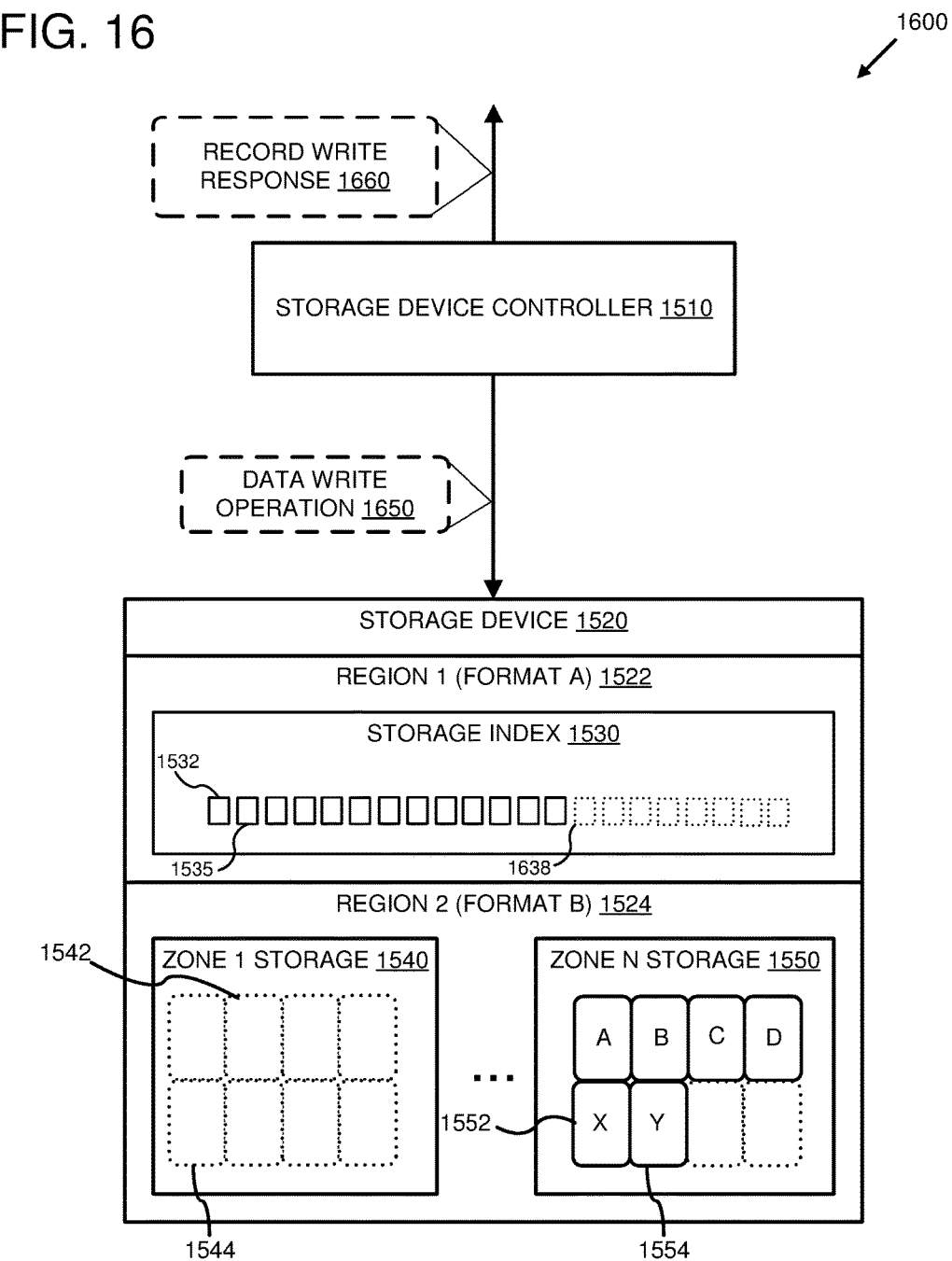

FIG. 16 as another system diagram depicting the example system 1500 after reclamation operations 1570 have been performed to reclaim the storage zone 1540. The record data associated with the index record entries 1532 and 1535, which was previously stored in the storage locations 1542 and 1544, have been moved to the storage locations 1552 and 1544 in the storage zone 1550. The storage index 1530 has been updated to remove the record entries 1551, 1553, 1554, and 1556-1558 that were marked as deleted and to associate the record entries 1532 and 1535 with the storage locations 1552 and 1554, respectively. The storage locations in the reclaimed storage zone 1540 (e.g., 1542 and 1544) are depicted in FIG. 16 as being available to store data.

In at least some embodiments, the storage index 1530 can include new record entries (e.g., 1638) associated with the storage locations in the storage zone 1540. In a scenario where the record write request 1560 was received by the storage device controller 1510, the storage device controller 1510 can transmit a data write operation 1650 to write the received additional record data to one or more of the storage locations in the reclaimed storage zone 1540. For example, some or all of the received record data can be written to the storage location 1542. A new record entry 1638 can be added to the storage index 1530 that maps a logical record identifier for the record to the storage location 1542. In at least one embodiment, the logical record identifier can be included with the record data provided by the data write request 1560. Alternatively, the logical record identifier can be generated by the storage device controller 1510 as part of the data write operation 1650. In such an embodiment, the storage device controller 1510 can transmit a record write response 1660 that comprises the generated logical record identifier associated with the record data to a sender of the data write request 1560.

In at least some embodiments, the storage index 1530 can be configured to organize the record entries using the record identifiers. For example, a logical record identifier can comprise an incrementing numerical value. In an embodiment where the storage index 1530 comprises a b-tree, using the incrementing logical record identifiers to organize the b-tree can ensure that new record entries are always added to an end of the b-tree instead of in the middle of the b-tree.

Figure 17:
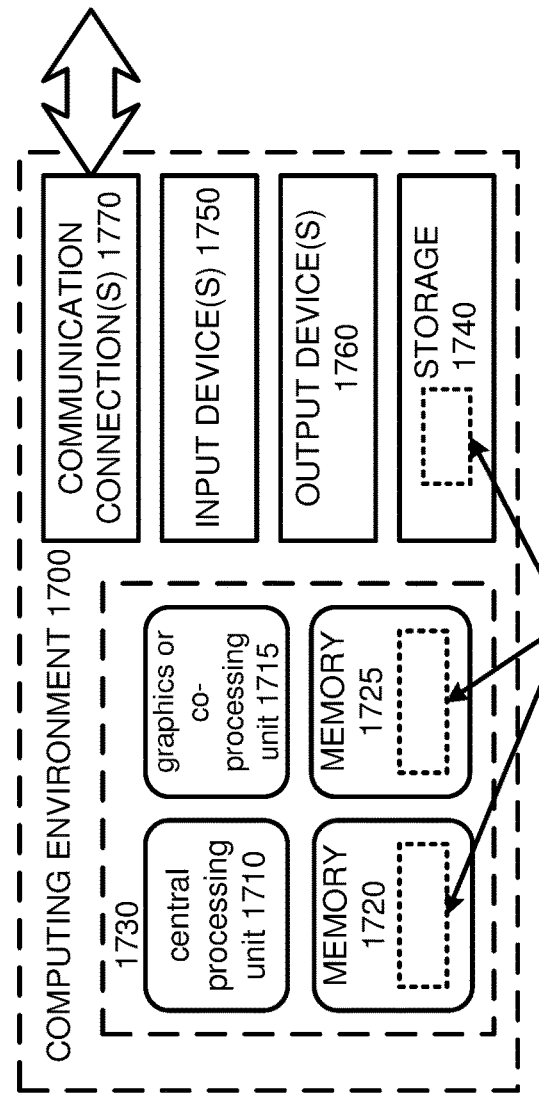
FIG. 17 depicts a generalized example of a suitable computing environment in which the described innovations may be implemented.

FIG. 17 depicts a generalized example of a suitable computing environment 1700 in which the described innovations may be implemented. The computing environment 1700 is not intended to suggest any limitation as to scope of use or functionality, as the innovations may be implemented in diverse general-purpose or special-purpose computing systems. For example, the computing environment 1700 can be any of a variety of computing devices (e.g., desktop computer, laptop computer, server computer, tablet computer, etc.).

With reference to FIG. 17, the computing environment 1700 includes one or more processing units 1710, 1715 and memory 1720, 1725. In FIG. 17, this basic configuration 1730 is included within a dashed line. The processing units

1710, 1715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 17 shows a central processing unit 1710 as well as a graphics processing unit or co-processing unit 1715. The tangible memory 1720, 1725 may be volatile memory (e.g., registers, cache, RAM), non-volatile memory (e.g., ROM, EEPROM, flash memory, etc.), or some combination of the two, accessible by the processing unit(s). The memory 1720, 1725 stores software 1780 implementing one or more innovations described herein, in the form of computer-executable instructions suitable for execution by the processing unit(s).

A computing system may have additional features. For example, the computing environment 1700 includes storage 1740, one or more input devices 1750, one or more output devices 1760, and one or more communication connections 1770. An interconnection mechanism (not shown) such as a bus, controller, or network interconnects the components of the computing environment 1700. Typically, operating system software (not shown) provides an operating environment for other software executing in the computing environment 1700, and coordinates activities of the components of the computing environment 1700.

The tangible storage 1740 may be removable or non-removable, and includes magnetic disks, magnetic tapes or cassettes, CD-ROMs, DVDs, or any other medium which can be used to store information in a non-transitory way and which can be accessed within the computing environment 1700. The storage 1740 stores instructions for the software 1780 implementing one or more innovations described herein. In some embodiments, storage 1740 comprises one or more of the example storage devices as described herein.

The input device(s) 1750 may be a touch input device such as a keyboard, mouse, pen, or trackball, a voice input device, a scanning device, or another device that provides input to the computing environment 1700. The output device(s) 1760 may be a display, printer, speaker, CD-writer, or another device that provides output from the computing environment 1700.

The communication connection(s) 1770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers. A computer-readable storage medium can be a storage device, as described herein.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A computing device comprising one or more processors and a computer-readable storage medium storing instructions that, when executed by the one or more processors, cause the computing device to perform operations, the operations comprising:
   storing an index in a first region of a storage device using a first storage format, wherein the index associates multiple zones of records with storage locations in a second region of the storage device where the records are stored using a second storage format, wherein the first storage format and the second storage format are different formats for recording data on one or more physical storage media of the storage device;
   receiving a request to delete one of the records stored in the second region of the storage device, wherein the request comprises a logical identifier for the record; and
   performing the requested delete by:
      locating an entry in a zone of the index in the first region of the storage device that is associated with the one of the records using the logical identifier, and
      updating the located entry in the zone of the index to indicate that the one of the records has been marked as deleted.

2. The computing device of claim 1, wherein the operations further comprise:
   receiving a request to read a record from a storage location in the second region of the storage device;
   using the index in the first region of the storage device to determine whether the requested record is marked as deleted; and
   returning the requested record from the second region of the storage device only if the requested record is not marked as deleted in the index in the first region of the storage device.

3. The computing device of claim 1, wherein the operations further comprise:
   storing utilization metadata in the first region of the storage device that indicates a percentage of storage locations in the second region of the storage device that are storing records in the zone that are not marked as deleted; and
   responsive to updating the entry in the zone for the one of the records, decreasing the percentage in the utilization metadata.

4. The computing device of claim 3, wherein the operations further comprise:
   determining that the percentage in the utilization metadata is below a specified threshold;
   identifying entries in the zone for records that are not marked for deletion;
   writing the identified records to contiguous storage locations in the second region using the second storage format; and
   updating the index in the first region to associate the zone with the records written to the contiguous storage locations and to indicate that the storage locations that were previously associated with the zone are available for storing additional records.

5. The computing device of claim 4, wherein the operations further comprise:
   receiving a request to write a record to the storage device; and
   writing the record to a storage location in the second region of the storage device that the index indicates is available using the second storage format.

6. A storage device controller configured to:
   receive a request to modify data stored in a first region of a storage device in a first storage format;
   locate an entry in a storage index associated with the data to be modified, wherein the storage index is stored in a second region of the storage device in a second storage format, different from the first storage format, wherein the first storage format and the second storage format are different formats for recording data on one or more physical storage media of the storage device; and
   update the entry in the storage index instead of modifying the data in the first region of the storage device.

7. The storage device controller of claim 6, wherein:
   the request to modify the data comprises a request to delete the data; and
   updating the entry in the storage index comprises marking the entry as deleted.

8. The storage device controller of claim 7, wherein locating the entry in the storage index comprises:
   locating a storage zone page in the storage index, wherein the storage zone page identifies a range of storage locations in the first region of the storage device and comprises index entries associating data identifiers with storage locations within the range of storage locations; and
   locating an index entry of the storage zone page using the identifier associated with the data.

9. The method storage device controller of claim 8, further configured to:
   detect that a number of the index entries in the storage zone page that are marked as deleted is greater than or equal to a specified threshold;
   identify index entries in the storage zone page that are not marked as deleted;
   rewrite data associated with the index entries that are not marked as deleted to a contiguous set of storage locations in the range of storage locations, using the first storage format; and
   update the storage index to indicate that a remainder of the storage locations in the range of storage locations are available for storing data.

10. The storage device controller of claim 9, further configured to:
    receive a request to store additional data in the storage device; and
    store the additional data in one of the storage locations in the first region that is indicated by the storage index as available for storing data, wherein the additional data is stored using the first storage format.

11. The storage device controller of claim 7, further configured to:
    receive a request to retrieve the data from the first region of the storage device;
    locate the entry for the data in the storage index in the second region of the storage device;
    determine that the entry is marked as deleted; and
    return a response indicating that the requested data has been deleted from the first region of the storage device.

12. The storage device controller of claim 6, wherein:
locating the entry in the storage index associated with the data to be modified comprises using an identifier associated with the data to locate a leaf node in a tree data structure of the storage index that identifies a storage location in the first region of the storage device where the data is stored.

13. A storage device comprising:
one or more computer-readable storage media, comprising:
  a storage region comprising data items stored in a first storage format, and
  an index region comprising a storage index stored in a second storage format,
wherein the storage index associates logical identifiers for the data items with index records for the data items, wherein an index record for a given data item identifies a physical storage location in the storage region where the given data item is stored,
wherein the first storage format and the second storage format are different formats for recording data on the one or more computer-readable storage media; and
a storage device controller configured to:
  receive a write request to delete one of the data items stored in the storage region, wherein the write request comprises a logical identifier for the one of the data items; and
  processing the write request by updating an index record in the storage index associated with the logical identifier for the one of the data items to indicate that the one of the data items is deleted.

14. The storage device of claim 13, wherein:
the storage index organizes the index records for the data items into multiple storage zones, wherein one of the storage zones is associated with a contiguous set of physical storage locations in the storage region where data items in the storage zone are stored; and
the storage device controller is further configured to:
  detect that a specified number of index records for data items in the one of the storage zones are marked as deleted;
  rewrite one or more of the data items that are not marked as deleted to a beginning of the contiguous set of physical storage locations associated with the one of the storage zones in the storage region; and
  make remaining physical storage locations in the contiguous set of physical storage locations available for storing new data items.

15. The storage device of claim 14, wherein:
the storage index comprises a tree data structure with leaf nodes associated with the storage zones, wherein a leaf node for the one of the storage zones comprises:
  the index records for the data items in the one of the storage zones; and
the storage device controller is further configured to use the logical identifier for the one of the data items to locate the leaf node for the one of the storage zones.

16. The storage device of claim 13, wherein the storage device controller is further configured to:
receive a request to retrieve the one of the data items from the storage region;
determine that the index record associated with the logical identifier for the one of the data items in the storage index indicates that the one of the data items is deleted; and
transmit a response indicating that the one of the data items does not exist.

17. The storage device of claim 16, wherein determining that the index record associated with the logical identifier for the one of the data items in the storage index indicates that the one of the data items is deleted comprises:
retrieving the one of the data items from the storage region;
locating an identifier for the one of the data items in a header of the one of the data items; and
retrieving the index record from the storage index using the located identifier.

18. The storage device of claim 13, wherein:
the index region further comprises a second storage index, wherein the second storage index associates storage addresses for physical storage locations in the storage region with the index records for the data items; and
the storage device controller is further configured to:
  receive a request to retrieve the one of the data items from the storage region, wherein the request comprises a storage address for a physical storage location in the storage region where the one of the data items is stored,
  retrieve the index record for the one of the data items from the second storage index using the storage address,
  determine that the index record indicates that the one of the data items is marked as deleted, and
  transmit a response indicating that the one of the data items does not exist.

19. The storage device of claim 13, wherein:
the first storage format is a shingled magnetic recording format; and
the second storage format is a perpendicular magnetic recording format.

20. The storage device of claim 13, wherein the index region and the storage region are in different computer-readable storage media of the storage device.

* * * * *